(12) United States Patent
Romano et al.

(10) Patent No.: US 9,665,095 B1
(45) Date of Patent: May 30, 2017

(54) SYSTEMS AND METHODS FOR REMOVING DEBRIS FROM WAREHOUSE FLOORS

(71) Applicant: Amazon Technologies, Inc., Seattle, WA (US)

(72) Inventors: Joseph Romano, Seattle, WA (US); Peter R. Wurman, Acton, MA (US); Dennis Polic, North Reading, MA (US); Peter K. Mansfield, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 14/662,893

(22) Filed: Mar. 19, 2015

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G05D 1/02* | (2006.01) |
| *B25J 11/00* | (2006.01) |
| *A47L 11/24* | (2006.01) |

(52) U.S. Cl.
CPC ............ *G05D 1/0038* (2013.01); *A47L 11/24* (2013.01); *B25J 11/0085* (2013.01); *G05D 1/0246* (2013.01); *G05D 1/0282* (2013.01); *A47L 2201/04* (2013.01); *A47L 2201/06* (2013.01); *Y10S 901/01* (2013.01); *Y10S 901/47* (2013.01)

(58) Field of Classification Search
CPC .. G05D 1/0038; G05D 1/0246; G05D 1/0282; B25J 11/0085; A47L 11/24; A47L 2201/06; A47L 2201/04; Y10S 901/01; Y10S 901/47
See application file for complete search history.

(56) References Cited

U.S. PATENT DOCUMENTS

| | | | |
|---|---|---|---|
| 4,783,904 A | 11/1988 | Kimura | |
| 6,678,583 B2 | 1/2004 | Nasr et al. | |
| 6,883,201 B2 * | 4/2005 | Jones | A47L 5/30 15/319 |
| 7,039,499 B1 | 5/2006 | Nasr et al. | |
| 7,093,318 B2 * | 8/2006 | Konrad | A47L 1/02 15/301 |
| 7,448,113 B2 | 11/2008 | Jones et al. | |
| 8,239,992 B2 | 8/2012 | Schnittman et al. | |
| 9,215,962 B2 | 12/2015 | Qian | |
| 2004/0049877 A1 * | 3/2004 | Jones | A47L 5/30 15/319 |

(Continued)

*Primary Examiner* — Jaime Figueroa
(74) *Attorney, Agent, or Firm* — Lee & Hayes, PLLC

(57) ABSTRACT

Robots or other machines may be used for retrieving errant objects from the floor of an automated warehouse. A system can include one or more reporting methods to alert a central control to the existence and location of an object on the warehouse floor. The central control can establish a safety zone around the object to avoid contact with normal warehouse traffic (e.g., standard warehouse robots). The system can route a cleanup robot to the location to retrieve the object. The system can include a cleanup pod comprising a convertible shelving unit with a robotic arm. The cleanup pod can have a similar form factor as shelving units used for storing inventory in the warehouse, thereby enabling standard warehouse robots to lift and transport the cleanup pod to retrieve an object.

20 Claims, 20 Drawing Sheets

(56) References Cited

U.S. PATENT DOCUMENTS

| | | | |
|---|---|---|---|
| 2005/0204717 A1* | 9/2005 | Colens | A63B 47/021 56/344 |
| 2009/0125145 A1 | 5/2009 | Adachi et al. | |
| 2012/0064245 A1 | 3/2012 | Coutu et al. | |
| 2012/0152877 A1 | 6/2012 | Tadayon | |
| 2013/0037050 A1* | 2/2013 | Chao | A47L 1/02 134/6 |
| 2013/0200916 A1 | 8/2013 | Panagas | |
| 2013/0245810 A1 | 9/2013 | Sullivan et al. | |
| 2015/0128996 A1 | 5/2015 | Dooley et al. | |
| 2015/0158174 A1 | 6/2015 | Romanov et al. | |
| 2016/0234986 A1 | 8/2016 | Jacobsson et al. | |
| 2016/0271800 A1 | 9/2016 | Stubbs et al. | |
| 2016/0274586 A1 | 9/2016 | Stubbs et al. | |

* cited by examiner

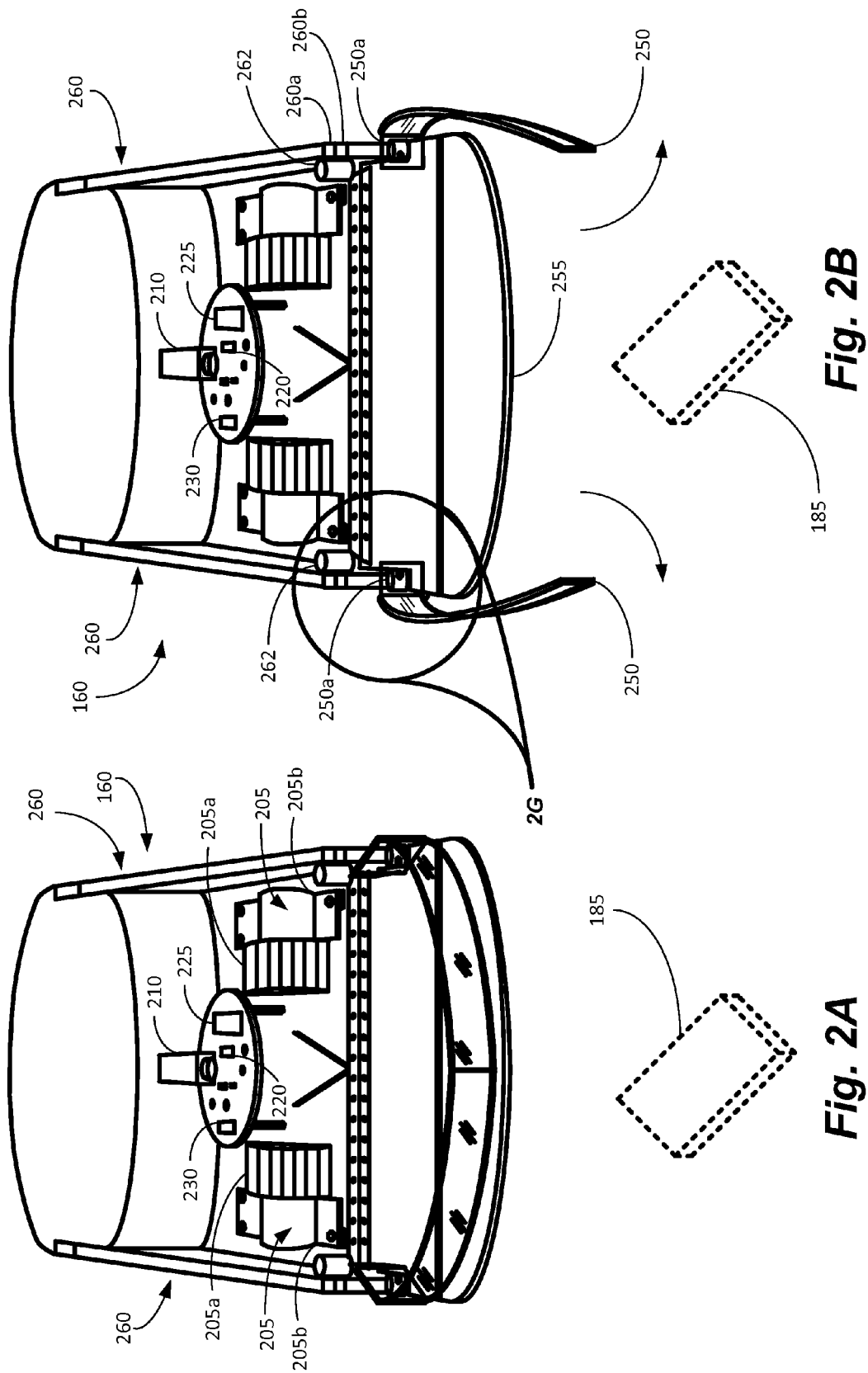

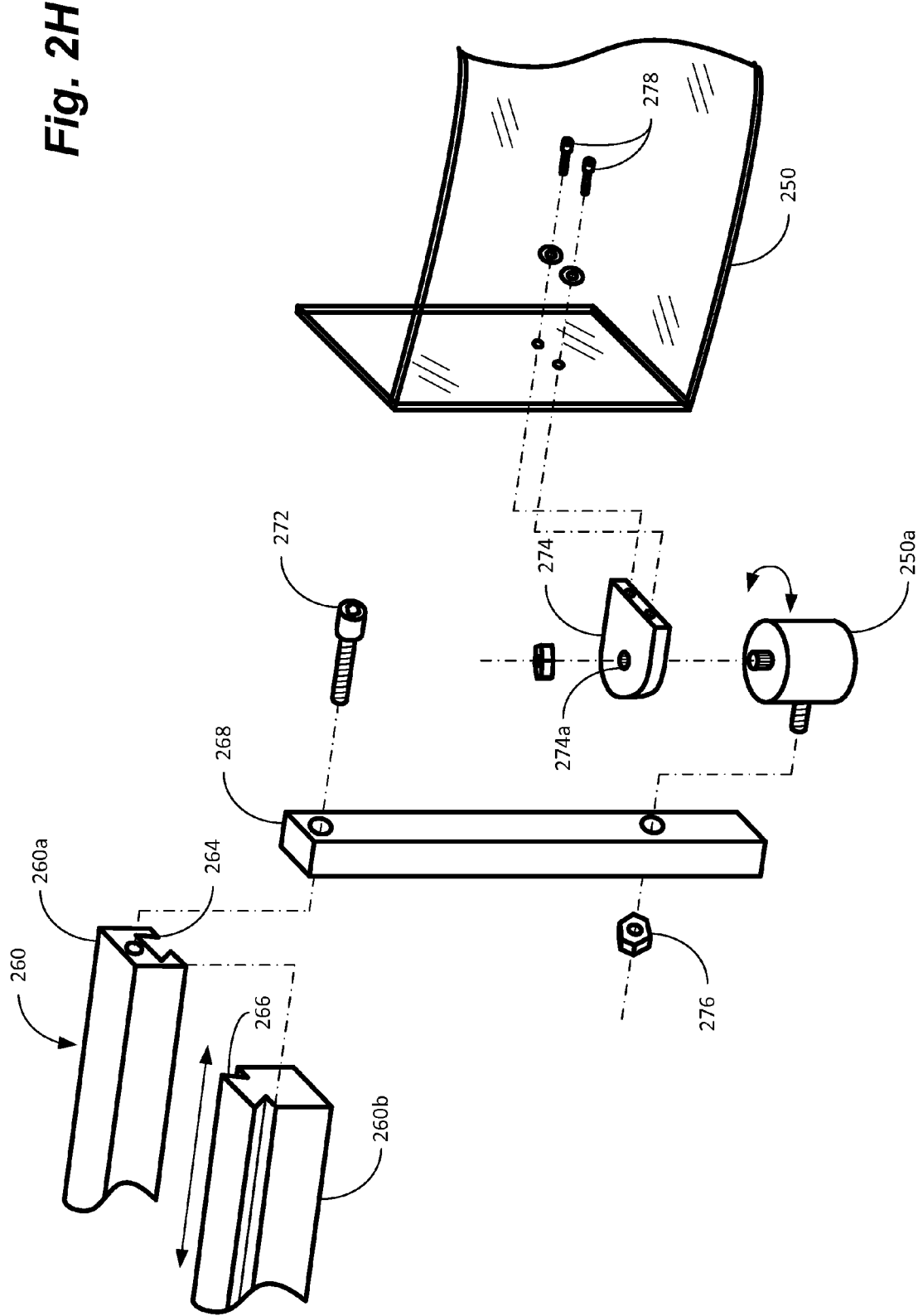

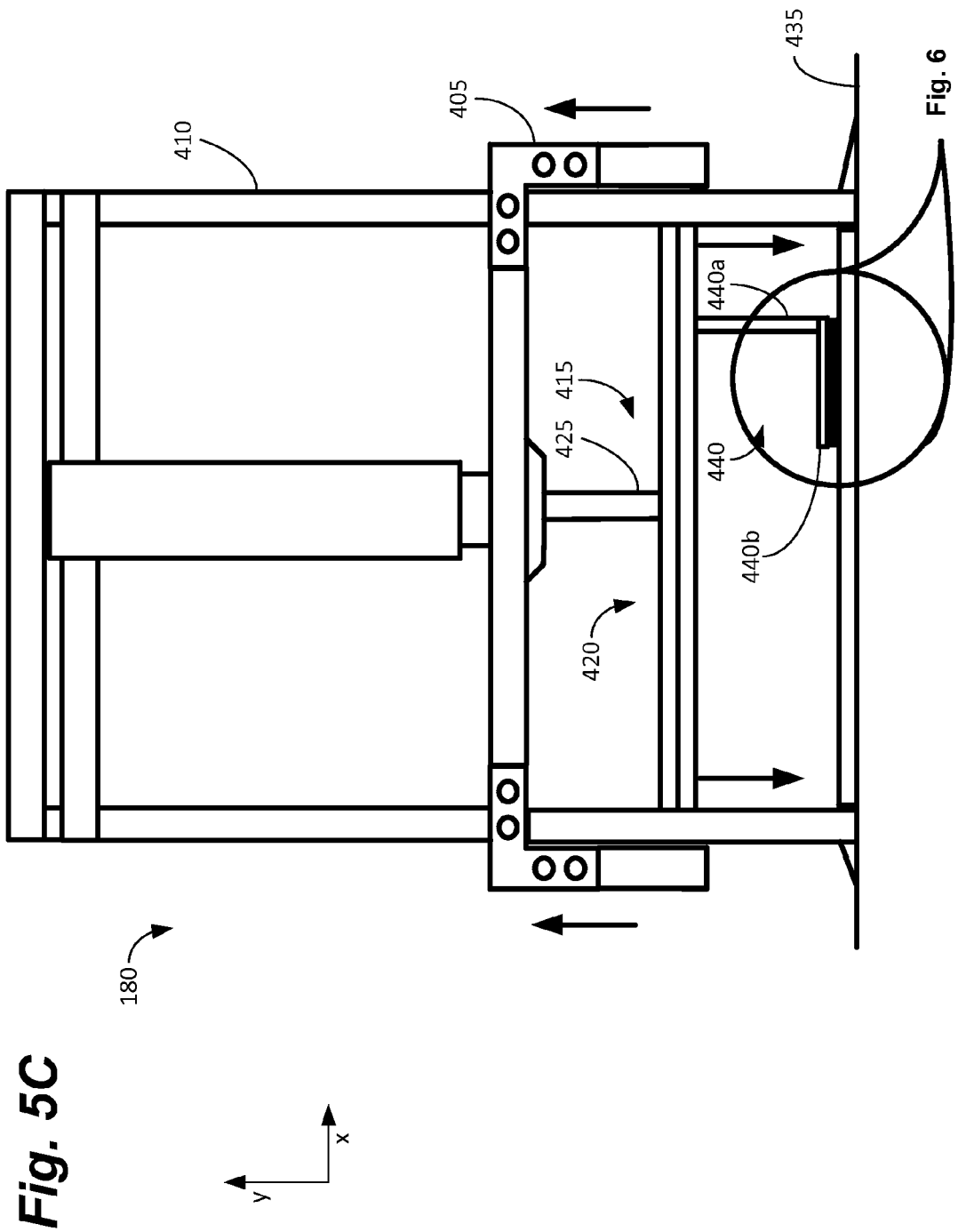

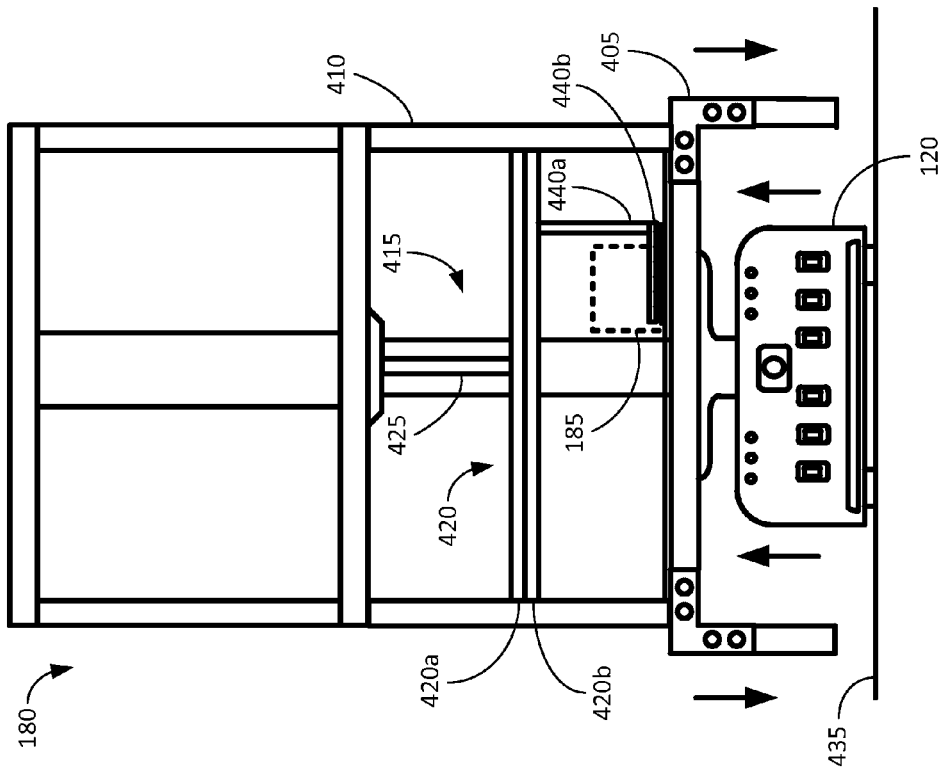
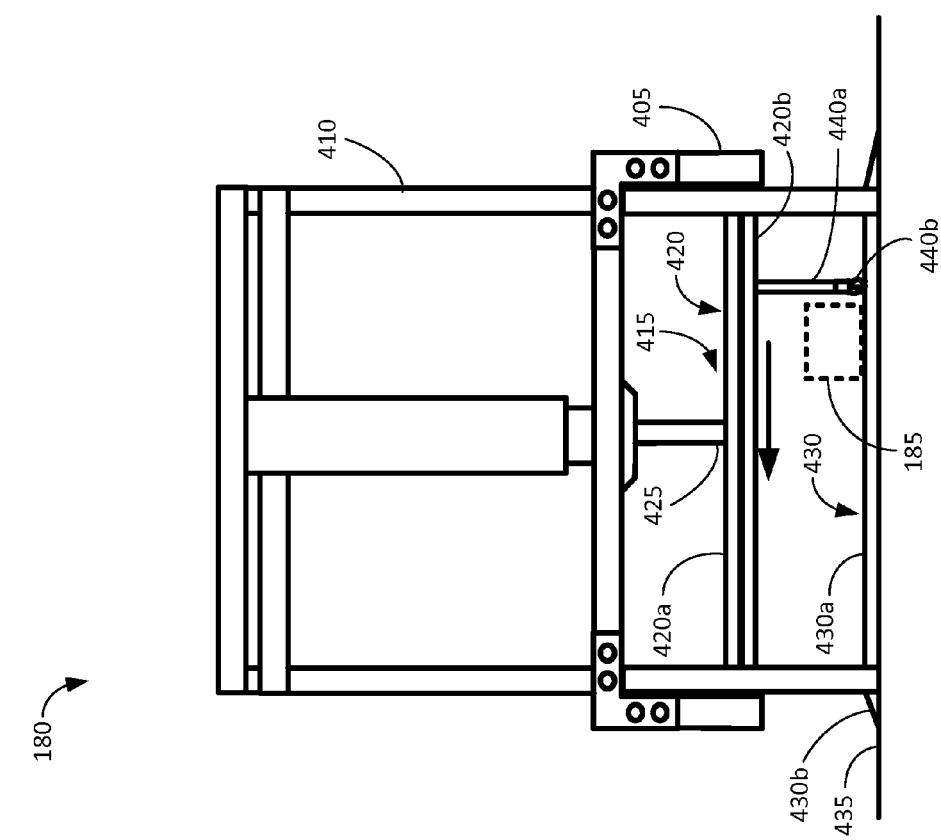

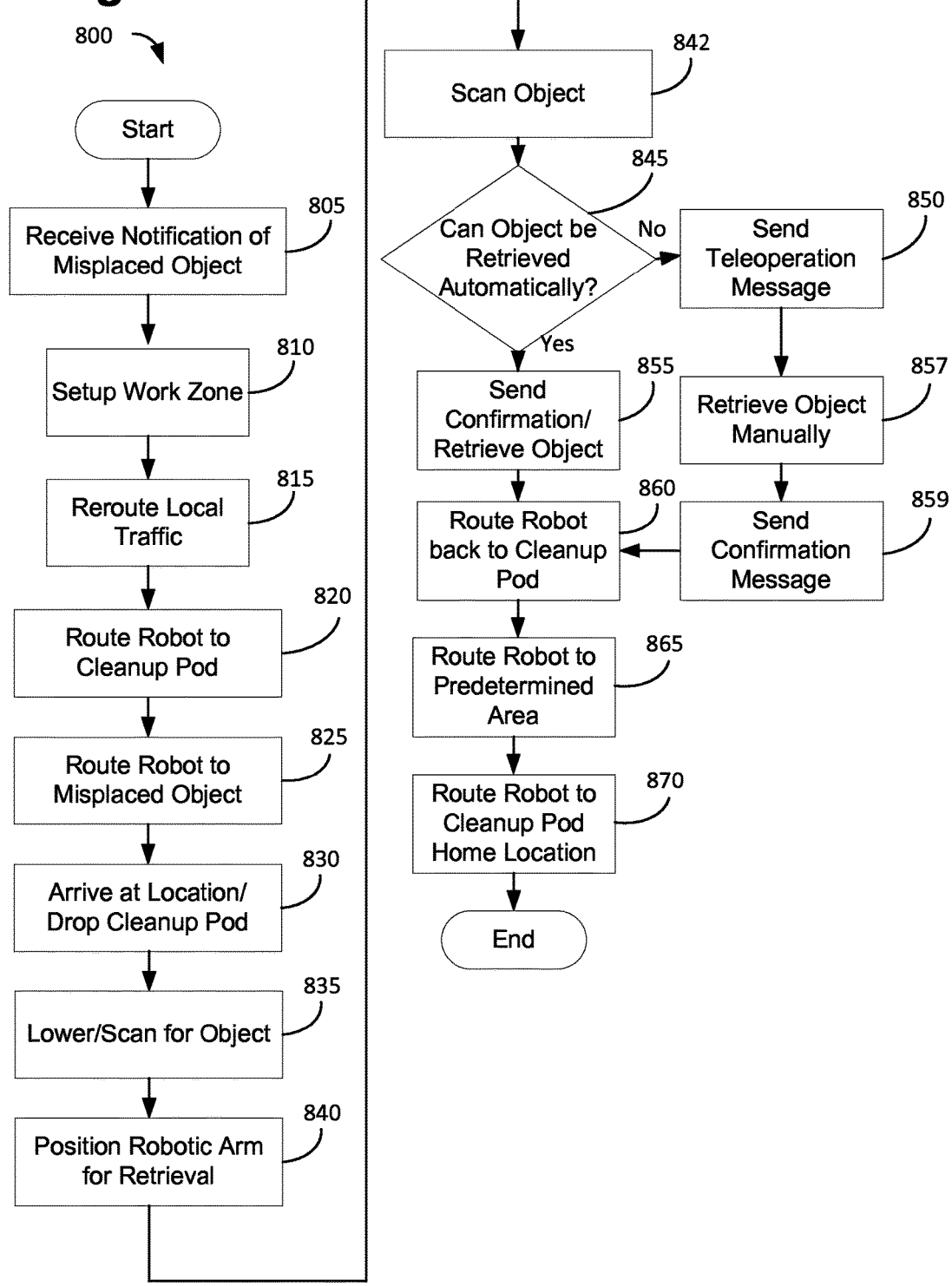

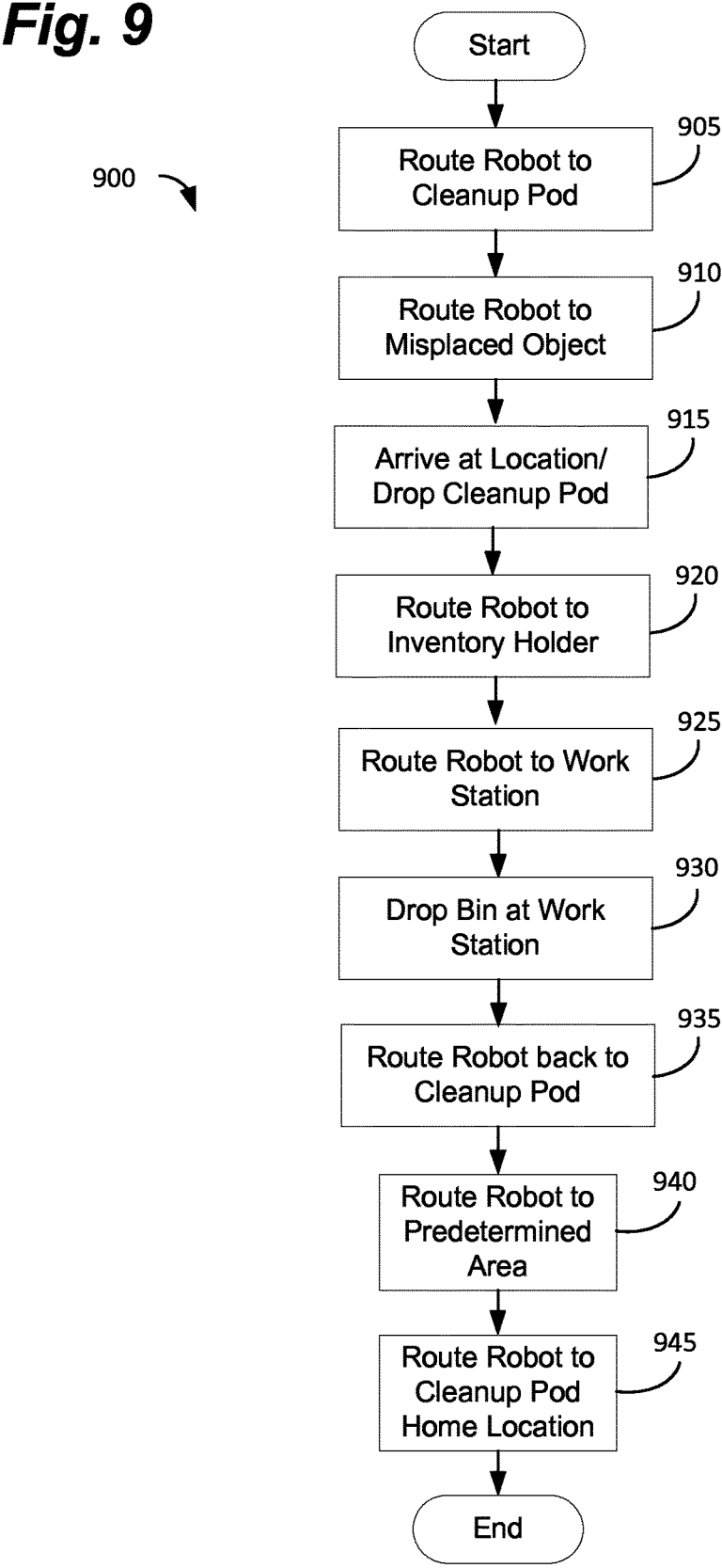

SYSTEMS AND METHODS FOR REMOVING DEBRIS FROM WAREHOUSE FLOORS

BACKGROUND

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Many systems, for example, comprise robots that travel to shelving systems to retrieve items, or the shelves themselves, and return them to a central location for additional processing.

Automated warehouses exist that use robots, for example, to move items or shelves from a storage location in the warehouse to a shipping location (e.g., for inventory items to be boxed and shipped). It is inevitable, however, that some items in the inventory system, trash, and other items will be dropped, misplaced, or otherwise mishandled during normal operations. In addition, merchandise can be damaged or destroyed when impacted or run over by the warehouse robots. Accurate inventories are also important to control costs, maintain inventory levels, and meet customer demand, among other things.

BRIEF DESCRIPTION OF THE FIGURES

FIGS. 2A-2E are isometric, front views of a cleaning robot retrieving an object, in accordance with some examples of the present disclosure.

FIG. 2H is an isometric, exploded view of a gate, gate arm, and gate actuator on the cleaning robot of FIGS. 2A-2E, in accordance with some examples of the present disclosure.

FIGS. 5A-5F are front views of a cleanup pod retrieving an object, in accordance with some examples of the present disclosure.

FIG. 8 is a flow diagram of a process for retrieving objects in a warehouse with a cleanup pod and a warehouse robot, in accordance with some examples of the present disclosure.

FIG. 9 is a flow diagram of a process for using a warehouse robot for multiple tasks, including retrieving an object, in accordance with some examples of the present disclosure.

DETAILED DESCRIPTION

Figure 1A:
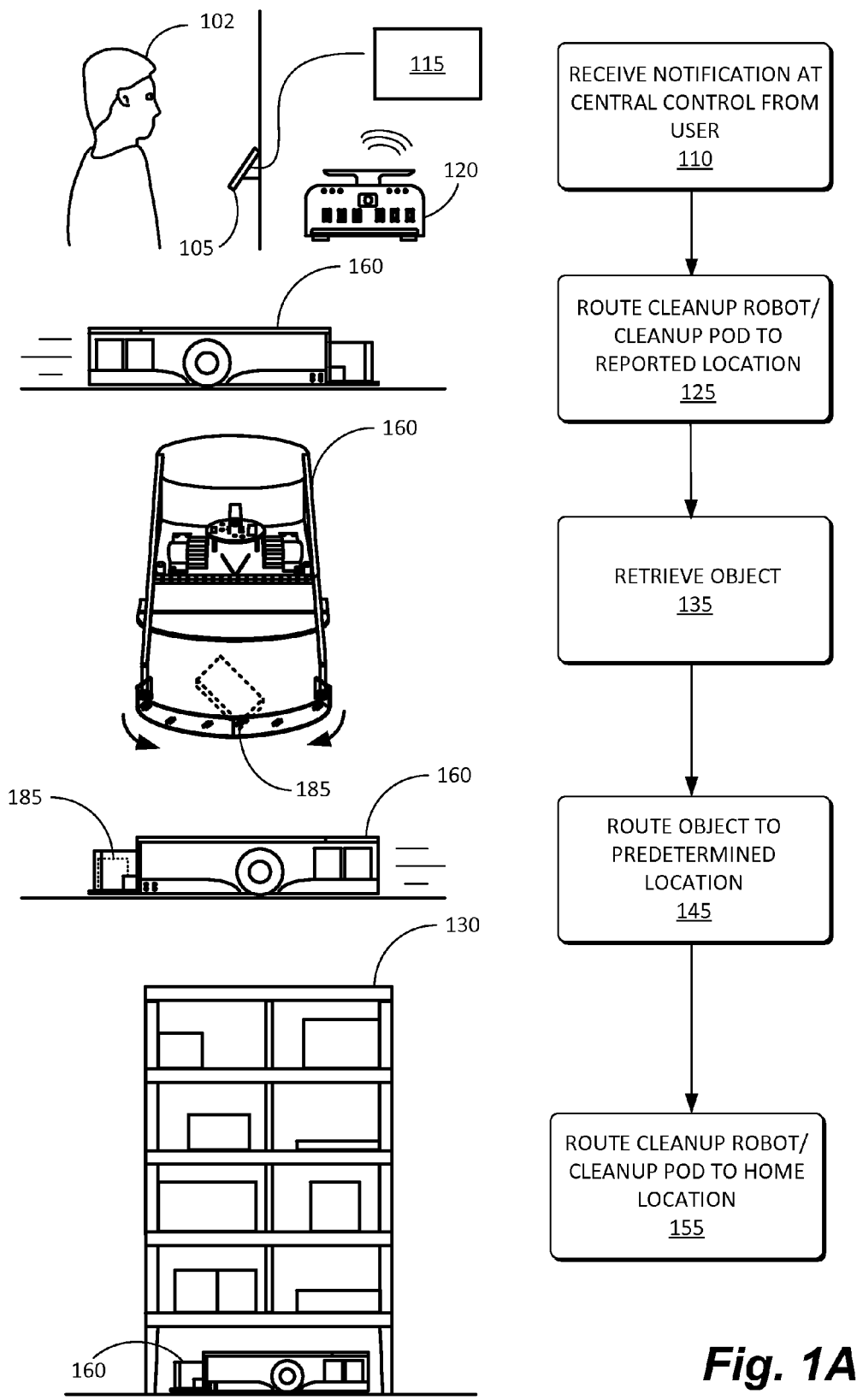
FIG. 1A is a pictorial flow diagram of an illustrative process for using a cleanup robot to remove objects from a warehouse floor, in accordance with some examples of the present disclosure.

Examples of the present disclosure relate generally to automated warehouses, and specifically to one or more types of devices for use in the warehouse to retrieve items on the warehouse floor and return them to an appropriate location. In some examples, the system can comprise an inventory holder or inventory pod, similar to those used in the warehouse for inventory, but comprising a moveable floor, or other lifting mechanism, and a robotic arm to manipulate and remove items from the warehouse floor. In other examples, the system can comprise an autonomous or semi-autonomous robot or mobile drive unit, similar to those used for moving shelving units, but with additional equipment for retrieving and removing items on the warehouse floor.

In some examples, as discussed below, the system can comprise one or more self-powered robots for removing errant items from the warehouse floor. The cleanup robots can be similar in form factor to the warehouse robots used in the automated warehouse. In this manner, the cleanup robots can move under and around inventory bins, or shelving units, to facilitate travel through the warehouse. The cleanup robots can include one or more arms and/or tools to manipulate objects onto a carrying tray located on the cleanup robot.

In this configuration, a central control can receive a notification that an object has been misplaced on the warehouse floor, preferably with a location. The notification can come from warehouse robots, for example, from workers, or from reporting stations located throughout the warehouse. The object could be merchandise that has fallen out of an inventory bin, for example, or trash. The central control can then route a cleanup robot to the reported location to retrieve the object. The cleanup robot can then deliver the object to a worker for inspection, for example, or to a trash receptacle, as appropriate. In some examples, the central control can comprise the same central control associated with the automated warehouse system. In other examples, the central control can comprise a separate system in communication with the automated warehouse system.

In other examples, the system can comprise a cleanup pod. The cleanup pod can comprise a robotic shelving unit with a similar form factor to the inventory holders located in the warehouse. In this manner, the cleanup pod can be conveniently stored alongside inventory holders and can be carried and transported by a warehouse robot. The cleanup pod can comprise a robotic arm and a carrying tray disposed on an upper frame, with the robotic arm enabling the cleanup pod to manipulate objects onto the carrying tray. The cleanup pod can comprise a base slideably engaged with the upper frame giving the cleanup pod a raised position and a lowered position. In the raised position, the cleanup pod can be carried by a warehouse robot. In the lowered position, the robotic arm and carrying tray can be disposed substantially at the warehouse floor level to retrieve objects.

In this configuration, the central control can again receive a notification that an object has been misplaced on the warehouse floor, preferably with a location. The central control can then route a warehouse robot to retrieve a cleanup pod and deliver it to the reported location to retrieve the object. The cleanup pod can then lower and retrieve the object with the robotic arm. The warehouse robot can then return and retrieve the cleanup pod and deliver it, and the object, to a worker for inspection, for example, or to a trash receptacle, as appropriate.

As shown in FIG. 1A, at 110, recovery of an errant object 185 can start with a user 102 or a warehouse robot 120 sending a notification to the central control 115, e.g., a management module. A user 102 can send the notification via the reporting station 105, for example. The warehouse robots 120, on the other hand, can be equipped with imaging devices, e.g., cameras, or other sensors enabling them to identify objects on the warehouse floor. Because the warehouse robots 120 are already in communication with the central control 115 (e.g., via a wireless network), they can send a message directly to the central control 115. In some examples, the notification can contain an approximate location if the object 185. In other examples, the user 102 or warehouse robot 120 may be able to provide a grid 175a number or a fiducial number 175, which can provide a more accurate location for the object 185.

At 125, the central control 115 can route a cleanup robot 160 to the approximate location of the object. As described herein, in some cases, prior to sending the cleanup robot 160, the central control 115 can establish a safety zone or area and/or reroute traffic around the object 185. In other embodiments, the central control 115 can also override designated travel directions or use other means to shorten/expedite the cleanup robot's 160 travel time.

At 135, the cleanup robot 160 can retrieve the object 185. In some examples, upon arriving on the scene, the cleanup robot 160 can locate and identify the actual location of the object 185 using imaging devices or other sensors. In some cases, the central control 115 can adjust or redesignate the safety zone or area based on the updated, actual location of the object 185.

At 145, the central control 115 can route the cleanup robot 160 to a predetermined location. If the object 185 is inventory, for example, the cleanup robot 160 can be routed to a work station to enable a worker to inspect the object 185 and/or take other actions with respect to the object. In some cases, the object 185 may have been run over by warehouse robots 120, forklifts, or other equipment and may no longer be saleable. In other cases, the object 185 may be substantially undamaged and can be restocked for later sale. In still other embodiments, the object 185 can be trash and the predetermined location can comprise a trash or recycling bin or area, for example.

At 155, the cleanup robot 160 can be routed to a home location or another location. In some examples, the cleanup robot 160 can be shaped and sized to fit under standard inventory holders or pods 130, as shown. In other examples, the cleanup robot 160 can be routed to a docking station, or other designated parking area, to be recharged or otherwise maintained. In still other examples, the cleanup robot 160 can be routed to retrieve another object 185 from the warehouse floor. Of course, while FIG. 1A is shown utilizing a cleanup robot 160, as discussed below, a similar routine could be used to retrieve an object using a cleanup pod 180 and at least one warehouse robot 120.

Figure 1B:
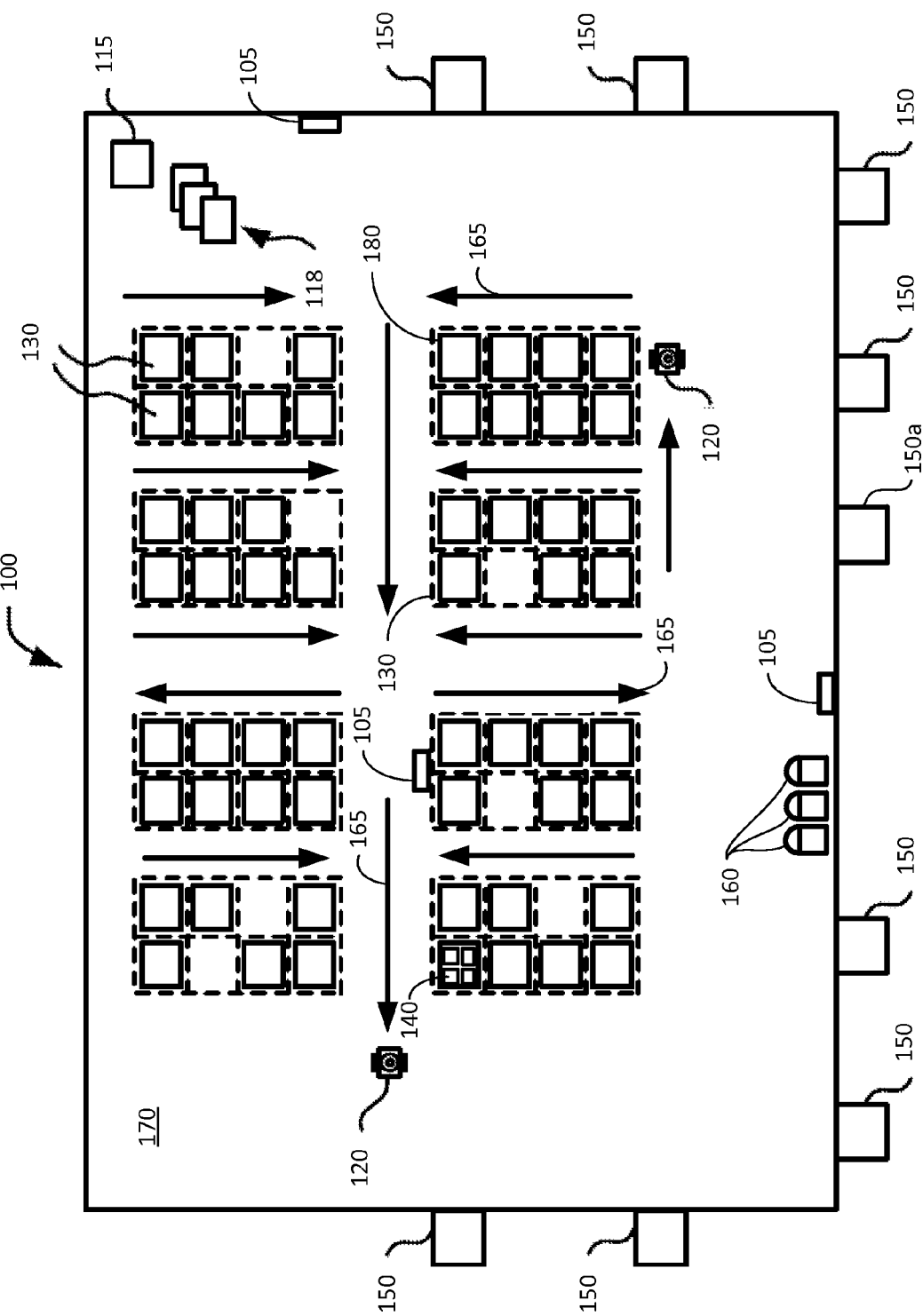
FIGS. 1B and 1C are schematic diagrams that depict components of an automated warehouse, in accordance with some examples of the present disclosure.

FIG. 1B illustrates an inventory control system 100. The inventory control system 100 can comprise a management module, or central control 115, one or more mobile drive units, or warehouse robots 120, one or more inventory containers, pods, or holders 130, and one or more inventory work stations 150. The warehouse robots 120 can transport the inventory holders 130 between points within a warehouse 170 on their own, or in response to commands communicated by the central control 115. Each inventory holder 130 can store one or more types of inventory items 140. As a result, the inventory control system 100 is capable of moving inventory items 140 between locations within a workspace, such as a storage facility or warehouse 170 to facilitate the entry, processing, and/or removal of inventory items 140 from inventory control system 100 and the completion of other tasks involving the inventory items 140.

The central control 115 can assign tasks to the appropriate components of the inventory control system 100 and coordinate operation of the various components in completing the tasks. These tasks may relate both to the movement and processing of inventory items and the management and maintenance of the components of inventory control system 100. The central control 115 may assign portions of the warehouse 170, for example, as parking spaces for the warehouse robots 120, the scheduled recharge or replacement of warehouse robot 120 batteries, the storage of inventory holders 130, cleanup robots 160, or cleanup pods 180, or any other operations associated with the inventory control system 100 and its various components.

The central control 115 may select components of the inventory control system 100 to perform these tasks and communicate appropriate commands and/or data to selected components to facilitate completion of these operations. Although shown in FIG. 1B as a single, discrete component, the central control 115 may represent multiple components and may represent, or include, portions of the warehouse robots 120, inventory holders 130, cleanup robots 160, cleanup pods 180, or other elements of the inventory control system 100. As a result, any or all of the interaction between a particular warehouse robot 120 and the central control 115 that is described below may, for example, represent peer-to-peer communication between that warehouse robot 120 and one or more other warehouse robots 120, or may comprise internal commands based on memory in the warehouse robot 120, for example.

As mentioned above, the warehouse robots 120 can be used to move inventory holders 130 between locations within the warehouse 170. The warehouse robots 120 may represent many types of devices or components appropriate for use in inventory control system 100 based on the characteristics and configuration of inventory holders 130 and/or other elements of inventory control system 100. In a particular embodiment of inventory control system 100, the warehouse robots 120 can represent independent, self-powered devices, such as wheeled or tracked robots or robotic carts, for example, configured to freely move about warehouse 170. Examples of such inventory control systems are disclosed in U.S. Patent Publication No. 2012/0143427, published on Jun. 7, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

In other examples, the warehouse robots 120 can comprise track guided robots configured to move inventory holders 130 along tracks, rails, cables, a crane system, or other guidance or support elements traversing the warehouse 170. In this configuration, the warehouse robot 120 may receive power, communications, and/or support through a connection to guidance elements such as, for example, a powered rail, slot, or track. Additionally, in some examples of the inventory control system 100, the warehouse robot 120 may be configured to utilize alternative conveyance equipment to move within warehouse 170 and/or between separate portions of warehouse 170.

Additionally, the warehouse robots 120 may be capable of communicating with the central control 115 to receive tasks, inventory holder 130 assignments, transmit their locations or the locations of other warehouse robots 120, or exchange other suitable information to be used by central control 115 or warehouse robots 120 during operation. The warehouse robots 120 may communicate with central control 115 using, for example, wireless, wired, or other connections. In some examples, the warehouse robots 120 may communicate with central control 115 and/or each other using, for example, 802.11 specification wireless transmissions (e.g., b/g/n), Bluetooth, radio frequency (RF), Infrared Data Association (IrDA) standards, or other appropriate wireless communication protocols.

In other examples, such as in an inventory control system 100 using tracks, the tracks or other guidance elements (e.g., slots or rails) along which a warehouse robot 120 moves may be wired to facilitate communication between the warehouse robot 120 and other components of inventory control system 100. Furthermore, as noted above, the warehouse robot 120 may include components of the central control 115 such as, for example, processors, modules, memory, and transceivers. Thus, for the purposes of this description and the claims that follow, communication between central control 115 and a particular warehouse robot 120 may also represent communication between components within a particular warehouse robot 120. In general, the warehouse robots 120 can be powered, propelled, and controlled in many ways based on the configuration and characteristics of a particular inventory control system 100.

The inventory holders 130 are used to store inventory items and can include additional features as part of the inventory control system 100. In some examples, each of the inventory holders 130 can include multiple dividers to create multiple bays or bins within the inventory holder 130. In this configuration, each inventory holder 130 can store one or more types of inventory items 140 in each bay or bin (e.g., each inventory holder 130 may store the same inventory item 140 in all bays or bins, or different inventory items 140 in each bay or bin, or have no bays or bins and store just one type of item 140). Additionally, in particular examples, inventory items 140 may also hang from hooks or bars within, or on, the inventory holders 130. In general, the inventory holders 130 may store inventory items 140 in any appropriate manner within the inventory holders 130 and/or on the external surface of inventory holders 130.

The inventory holders 130 can be configured to be carried, rolled, and/or otherwise moved by the warehouse robots 120. In some examples, the inventory holders 130 may also provide propulsion to supplement that provided by the warehouse robot 120 when moving multiple inventory holders 130, for example. Additionally, each inventory holder 130 may include a plurality of sides, and each bay or bin may be accessible through one or more sides of the inventory holders 130. For example, in a particular embodiment, the inventory holders 130 include four sides. In such an embodiment, bays or bins located at a corner of two sides may be accessible through either of those two sides, while each of the other bays or bins is accessible through an opening in one of the four sides and an inventory holder 130 without any bays or bins may be accessible via all four sides. The warehouse robot 120 may be configured to rotate inventory holders 130 at appropriate times to present a particular face and the shelves, bays, bins or dividers associated with that face to an operator or other components of inventory control system 100 to facilitate removal, storage, counting, or other operations with respect to inventory items 140.

In particular examples, the inventory control system 100 may also include one or more inventory work stations 150. Inventory work stations 150 represent locations designated for the completion of particular tasks involving inventory items. Such tasks may include the removal of inventory items 140, the addition, or restocking, of inventory items 140, the counting of inventory items 140, the unpacking of inventory items 140 (e.g. from pallet- or case-sized groups to individual inventory items), the consolidation of inventory items 140 between inventory holders 130, and/or the processing or handling of inventory items 140 in any other suitable manner. The work stations 150 may represent both the physical location and also any appropriate equipment for processing or handling inventory items, such as work benches, packing tools and supplies, scanners for monitoring the flow of inventory items in and out of inventory control system 100, communication interfaces for communicating with central control 115, and/or any other suitable components. Inventory work stations 150 may be controlled, entirely or in part, by human operators or may be partially or fully automated.

In some examples, the system 100 can also comprise one or more inspection stations 150a. The inspection stations 150a can be manned by one or more workers trained to inspect objects that have fallen out of bins, for example, and have been returned by a cleanup pod or robot, as discussed below. In some cases, the object may have been run over by other robots 120 and damaged, for example, or may otherwise be unsaleable. In this case, the worker can discard the object, for example, or return it to the vendor for a refund, depending on the vendor agreement, among other things. In other examples, the object may be substantially undamaged and thus, can be returned to inventory.

In operation, the central control 115 selects appropriate components to complete particular tasks and transmits task assignments 118 to the selected components. These tasks may relate to the retrieval, storage, replenishment, and counting of inventory items and/or the management of warehouse robots 120, inventory holders 130, inventory work stations 150, cleanup robots 160, cleanup pods 180, and other components of inventory control system 100. Depending on the component and the task to be completed, a particular task assignment 118 may identify locations, components, and/or actions associated with the corresponding task and/or any other appropriate information to be used by the relevant component in completing the assigned task.

In particular examples, the central control 115 generates task assignments 118 based, in part, on inventory requests that central control 115 receives from other components of inventory control system 100 and/or from external components in communication with central control 115. For example, in particular examples, an inventory request may represent a shipping order specifying particular inventory items that have been purchased by a customer and that are to be retrieved from inventory control system 100 for shipment to the customer. The central control 115 may also generate task assignments 118 in response to the occurrence of a particular event (e.g., in response to a warehouse robot 120 requesting a space to park), according to a predetermined schedule (e.g., as part of a daily start-up or cleaning routine), or at any appropriate time based on the configuration and characteristics of inventory control system 100.

The central control 115 may, in some cases, communicate task assignments 118 to a warehouse robot 120 that include one or more destinations for the warehouse robot 120. In this vein, the central control 115 may select a warehouse robot 120 based on the location or state of the warehouse robot 120, an indication that the warehouse robot 120 has completed a previously-assigned task, a predetermined schedule, and/or any other suitable consideration. For example, the task assignment may define the location of an inventory holder 130 to be retrieved, an inventory work station 150 to be visited, a storage location where the warehouse robot 120 should park until receiving another task, or a location associated with any other task appropriate based on the configuration, characteristics, and/or state of inventory control system 100, as a whole, or individual components of inventory control system 100.

As part of completing these tasks, the warehouse robots 120 may dock with various inventory holders 130 within the warehouse 170. The warehouse robots 120 may dock with inventory holders 130 by connecting to, lifting, and/or otherwise interacting with inventory holders 130 such that, when docked, the warehouse robots 120 are coupled to the inventory holders 130 and can move inventory holders 130 within the warehouse 170. While the description below focuses on particular examples of warehouse robots 120 and inventory holders 130 that are configured to dock in a particular manner, alternative examples of warehouse robots 120 and inventory holders 130 may be configured to dock in any manner suitable to allow warehouse robots 120 to move inventory holders 130 within warehouse 170.

Components of inventory control system 100 may provide information to the central control 115 regarding their current state, the state of other components of inventory control system 100 with which they are interacting, and/or other conditions relevant to the operation of inventory control system 100. This may allow central control 115 to utilize feedback from the relevant components to update algorithm parameters, adjust policies, or otherwise modify its decision-making to respond to changes in operating conditions or the occurrence of particular events. In addition, while central control 115 may be configured to manage various aspects of the operation of the components of inventory control system 100, in particular examples, the components themselves may also be responsible for some decision-making relating to certain aspects of their operation, thereby reducing the processing load on central control 115.

In some examples, the system 100 can also comprise one or more cleanup robots 160. The cleanup robots 160 can comprise, for example, modified or purpose built robots configured to retrieve misplaced items from the warehouse floor. In some examples, the cleanup robots 160 can be parked in designated or known locations in the warehouse 170. In other examples, the cleanup robots 160 can roam the warehouse floor in random or set patterns looking for misplaced items from the warehouse floor.

In still other examples, the system 100 can also comprise cleanup pods 180, with similar form factors as inventory holders 130, but with additional functionality. In this manner, when an obstacle such as, for example, dropped merchandise, trash, or clothing, is located in the warehouse 170, the location of the obstacle can be provided by one of the warehouse robots 120, for example, or a worker in the warehouse 170. The central control 115 can then send a warehouse robot 120 to retrieve the cleanup pod 180 and place the cleanup pod 180 near the obstacle for removal. Mechanisms on the cleanup pod 180 can retrieve the obstacle, place it on an internal shelf, and then the warehouse robot 120 can return the cleanup pod 180 to a predetermined location, or to a work station 150 for inspection or restocking, for example.

In some examples, travel by the robots in the warehouse 170 can be "one-way." In other words, the aisles of the warehouse 170 can have designated travel directions 165. In this manner, incidents, such as head-on collisions can be minimized. In addition, excessive maneuvering to route warehouse robots 120 around other warehouse robots 120 can be reduced. In some examples, however, the designated travel directions 165 can be overridden to facilitate the cleanup process (i.e., a cleanup robot 160 can be authorized to travel the "wrong way" to shorten its route).

In some examples, the system 100 can also comprise one or more reporting stations 105. As shown, the reporting stations 105 can be located in convenient locations throughout the warehouse 170 to enable an object 185 to be quickly reported to the central control 115 by a warehouse worker. In some examples, the reporting station 105 can comprise a PC, laptop, touchscreen device, or button. In some examples, the reporting station 105 can enable the worker to enter a location (e.g., a grid 175a or fiducial marker 175 number, as discussed below) to provide an approximate location of the object. In other embodiments, the reporting station 105 can be a simple button, with a relatively large number of reporting stations 105 throughout the warehouse 170. In this manner, the approximate location of the object can be provided simply by the location of the button. Of course, the resolution of this system increases with an increase in the number of reporting stations.

Figure 1C:
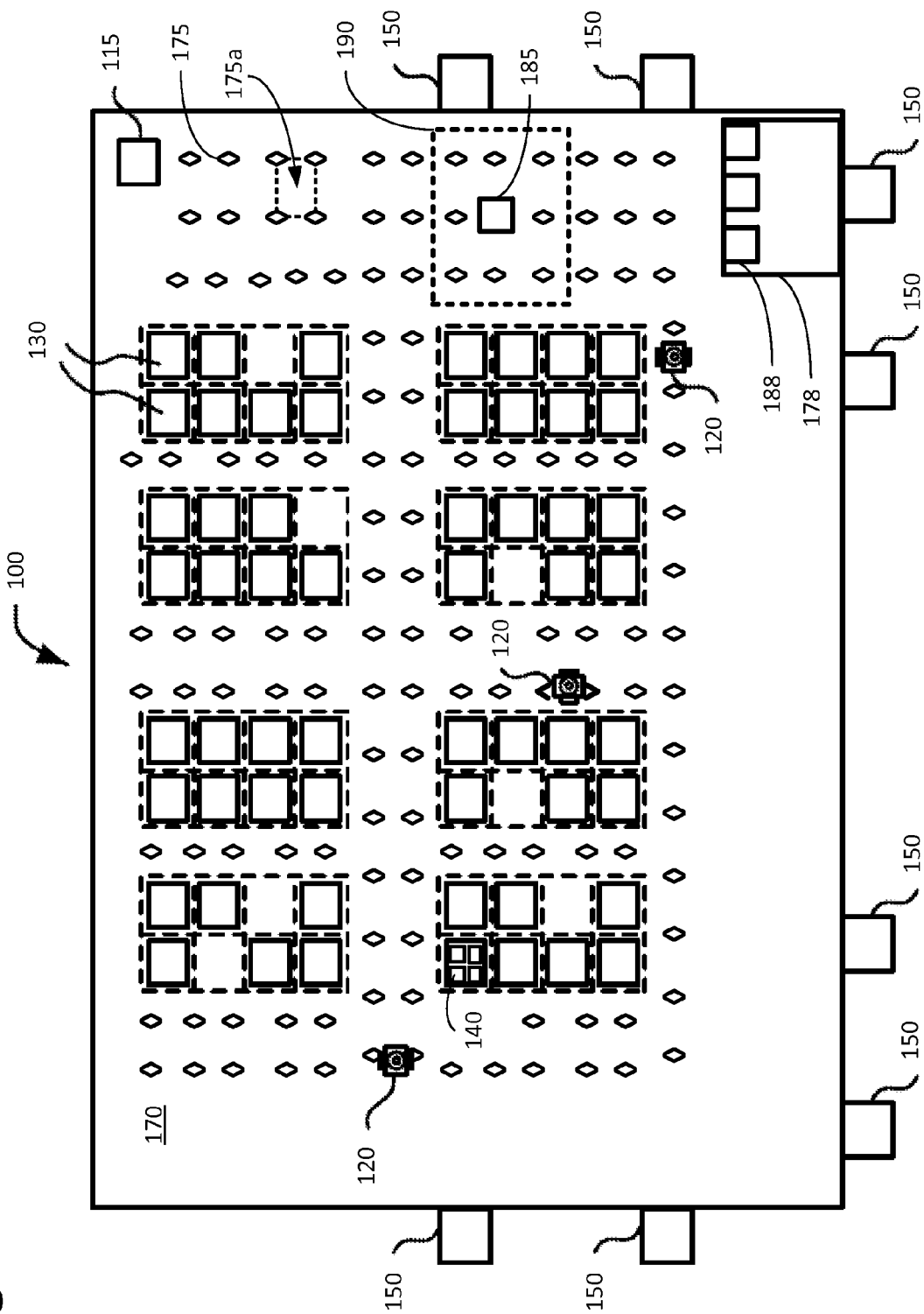

In some examples, as shown in FIG. 1C, the warehouse 170 floor can also comprise a plurality of markers, or fiducial markers 175, to enable the warehouse robots 120 and cleanup robots 160 to establish their location in the warehouse. Because the warehouse robots 120 and cleanup robots 160 are generally low enough to travel under inventory holders 130 (i.e., to be able to lift them), in some examples, the fiducial markers 175 can continue under the inventory holders 130, substantially spanning the entire floor. In some examples, the area between the fiducial markers 175 can define grid areas 175a with a fiducial marker 175 at each corner. When attempting to locate a particular inventory holder 130, therefore, the warehouse robot 120 can locate the fiducial marker 175, or grid 175a, associated with the inventory holder's 130 location by scanning the floor with a downward facing imaging device, scanner or other sensor and then confirm that it is in the right location by imaging, scanning or sensing the bottom of the inventory holder 130 with an upward facing imaging device, scanner or other sensor. In some examples, the inventory holder 130 and/or the fiducial markers 175 can include 2D or 3D bar codes, RFID tags, or other identifiers.

When an object 185, such as merchandise or trash, for example, is identified in the warehouse 170 by a worker or a warehouse robot 120, its location can be provided to the central control 115 (or a separate cleanup system) identifying the obstacle's grid 175a or fiducial marker 175. Based on this information, the central control 115 can then "close" a work zone 190 around the object 185. In some examples, the work zone 190 can define a number of grids 175a or fiducial markers 175 around the object 185. As shown, in some cases, the work zone 190 can comprise the nine fiducial markers 175 under and around the obstacle (i.e., the fiducial marker 175 closest to the object 185, and the eight adjacent fiducial markers 175). In other examples, the work zone 190 can comprise four grids 175a around the obstacle. Of course, the work zone 190 can be changed based on, for example, warehouse robot 120 speed, object 185 size, and traffic levels. Regardless, once established, the central control 115 can reroute warehouse robots 120 as necessary to avoid the work zone 190.

The central control 115 can then route a cleanup robot 160 or a warehouse robot 120 and the cleanup pod 180 to the location to retrieve the obstacle. In some examples, because the central control 115 has established the work zone 190, the designated travel direction 165 can be ignored/overridden to enable the cleanup robot 160 or cleanup pod 180 to travel the "wrong way" down an aisle. In other words, if the work zone 190 encompasses the designated travel direction 165, then the cleanup robot 160 is free to move down that portion of the aisle. Otherwise, in some examples, the central control 115 can temporarily override the designated travel direction 165 to provide a shorter path for the cleanup robot 160 or cleanup pod 180 to the object 185. This can enable the cleanup robot 160, or warehouse robot 120 and cleanup pod 180, to travel directly to the object 185, reducing travel time and distances.

In some examples, the cleanup robots 160 and/or cleanup pods 180 can be substantially autonomous, with the central control 115 merely providing location and/or routing information. In other examples, the central control 115 can route the cleanup robots 160 and/or cleanup pods 180 to the work zone 190 and then control of the cleanup robots 160 and/or cleanup pods 180 can revert to an operator, e.g., for teleoperation.

To this end, in some examples, the warehouse 170 can further comprise a control room 178 comprising one or more control terminals 188. The control terminals 188 can comprise, for example, a computer, laptop, tablet, or other device to enable the operator to remotely control the cleanup robots 160 and/or cleanup pods 180. In this manner, the control terminals 188 can comprise a video screen to receive images from the cleanup robots 160 and/or cleanup pods 180 and a control device, such as a joystick, to control the motion of the cleanup robots 160 and/or cleanup pods 180. Motion control can include, for example, moving the cleanup robot 160 around within the work zone 190 and/or controlling a robotic arm, pincer, or other means for retrieving the object, some of which are discussed below.

The control terminals 188 can be connected via a wireless connection, for example, and can be routed through, or independently of, the central control 115. In addition, because normal warehouse traffic (e.g., warehouse robots 120) is routed around the work zone 190, the operator is free to move the cleanup robot 160, for example, within the work zone 190 regardless of designated travel directions 165.

In some examples, as shown in FIGS. 2A-2E, the cleanup robot 160 can comprise a number of features to enable the retrieval and removal of objects 185. The cleanup robots 160 can comprise, for example, one or more drive units 205 to move the cleanup robot 160 in the warehouse 170. The drive units 205 can comprise, for example, one or more wheels, balls, tracks, or air cushions. As mentioned above, in some examples, the drive units 205 can be sized and shaped to follow a guidance track in the warehouse 170. The guidance track can comprise, for example, a train track, magnetic stripe, painted stripe, or electronic or visual markers. In this configuration, the drive units 205 can use optical, magnetic, or other sensors to follow the track. In other examples, the drive units 205 can comprise one or more drive wheels 205a and one or more drive motors 205b, or other means, and include a pin, scanner, or camera to follow a slot, magnetic or electrical pathway, or fiducial markers 175 in or on the floor of the warehouse 170.

To prevent accidents, detect faults, and provide guidance and navigation, the cleanup robots 160 can also be equipped with a number of sensors. In some examples, the cleanup robots 160 can comprise one or more imaging devices or cameras 210. The camera 210 can enable the cleanup robot 160 to detect other warehouse robots 120, cleanup robots 160, and objects 185. The cleanup robots 160 can also comprise one or more additional sensors, including, but not limited to, bump sensors, proximity sensors, laser scanners, etc. The camera 210 can comprise, for example, a video camera, infrared or infragreen camera, or ultraviolet (UV) camera. In some examples, the cleanup robots 160 can also comprise additional equipment such as, for example, global positioning system (GPS) receivers and wireless local area network (WLAN) or cellular transceivers.

The cleanup robots 160 can also comprise a processor 220, a memory module 225, and a wireless transceiver 230. The processor 220 can comprise, for example, a PC, laptop, field programmable gate array (FPGA), or application specific integrated chip (ASIC). The memory module 225 can comprise one or more types of volatile or non-volatile memory including, but not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the cleanup robot 160. In some embodiments, the memory module 225 may be non-transitory computer readable media. The wireless transceiver 230 can comprise a transceiver utilizing cellular, wireless local area network (WLAN) such as 801.11x protocols, radio-frequency (RF), or other suitable means to enable the cleanup robot 160 to communicate with the central control 115, among other things.

In some examples, the cleanup robot 160 can further comprise one or more gates 250 and a carrying tray 255. In some examples, the gates 250 can comprise a relatively stiff, clear material such as Plexiglas®. In this manner, the gates 250 can move objects 185 onto the carrying tray 255 without obstructing the camera's view. The gates 250 can also comprise one or more gate actuators 250a to rotate the gates 250. As shown, the gates 250 can be moved from a closed position (FIG. 2A) to an open position (FIG. 2B) to enable an object 185 to be corralled, and then retained, on the carrying tray 255, for example. The gate actuators 250a can comprise, for example, electric motors (including servo motors), hydraulic actuators, or pneumatic actuators.

Figure 2D:
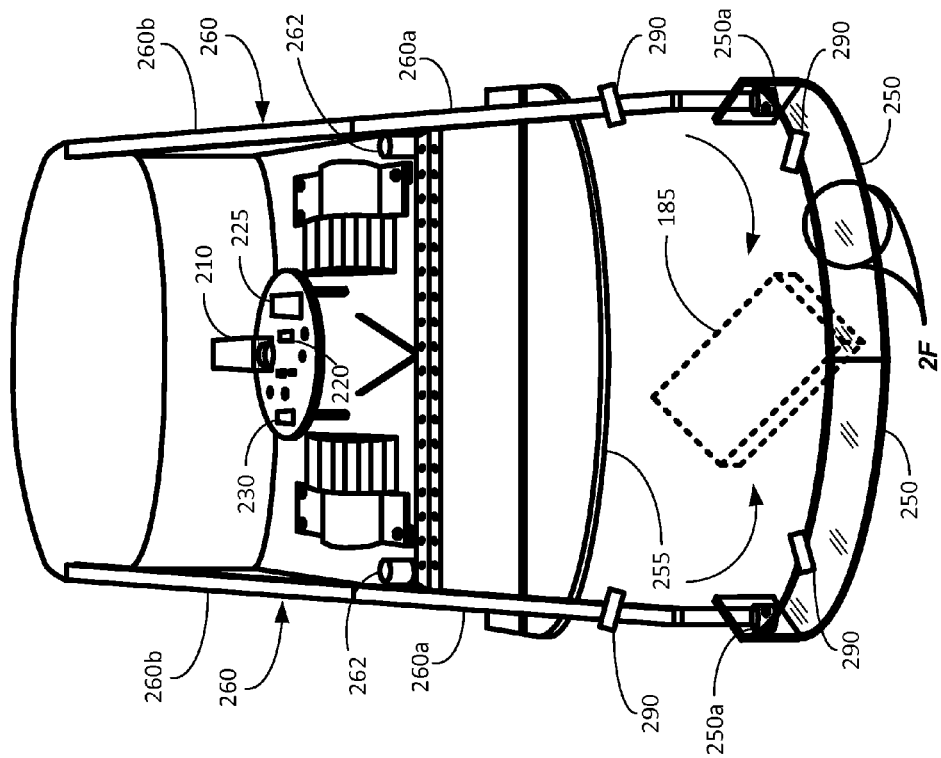
Figure 2C:
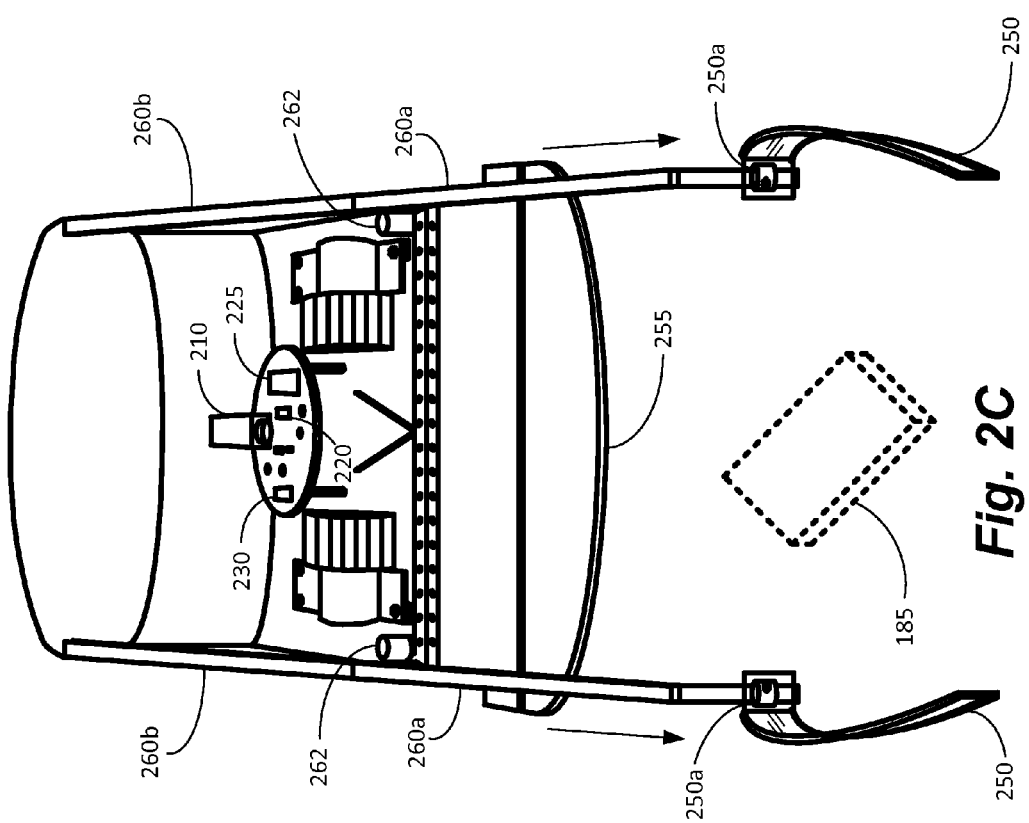

The gates 250 can also comprise gate arms 260 to translate the gates 250 from a retracted position (FIG. 2B) to an extended position (FIG. 2C). In some examples, the gate arms 260 can comprise one or more arms 260a slideably engaged with a track 260b mounted on the chassis of the cleanup robot 160. The gate arms 260 can further comprise one or more gate arm actuators 262 to move the arms 260a from the retracted to the extended position. The gate arm actuators 262 can comprise, for example, electric motors (including servo motors), hydraulic actuators, or pneumatic actuators.

Figure 2F:
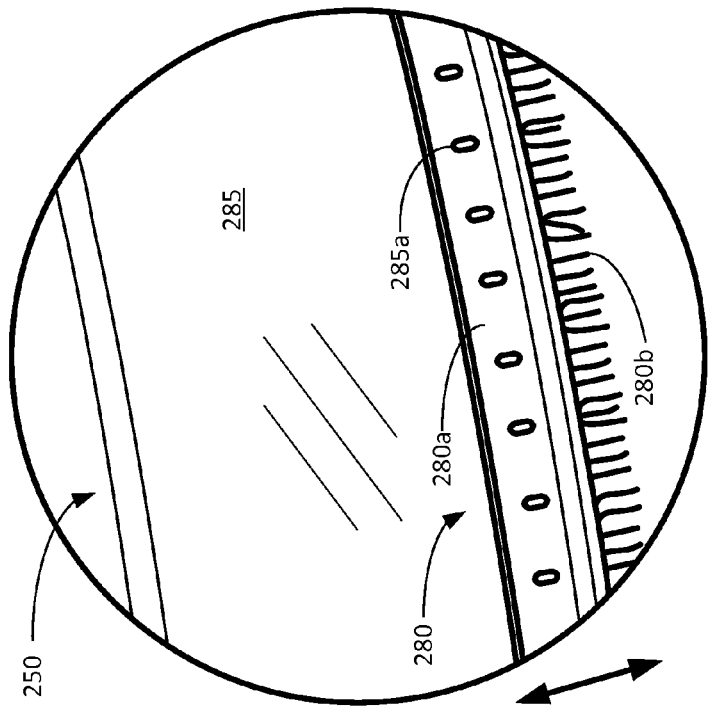
FIG. 2F is an isometric, detailed view of a gate with an edge strip on the cleaning robot of FIGS. 2A-2E, in accordance with some examples of the present disclosure.
Figure 2E:
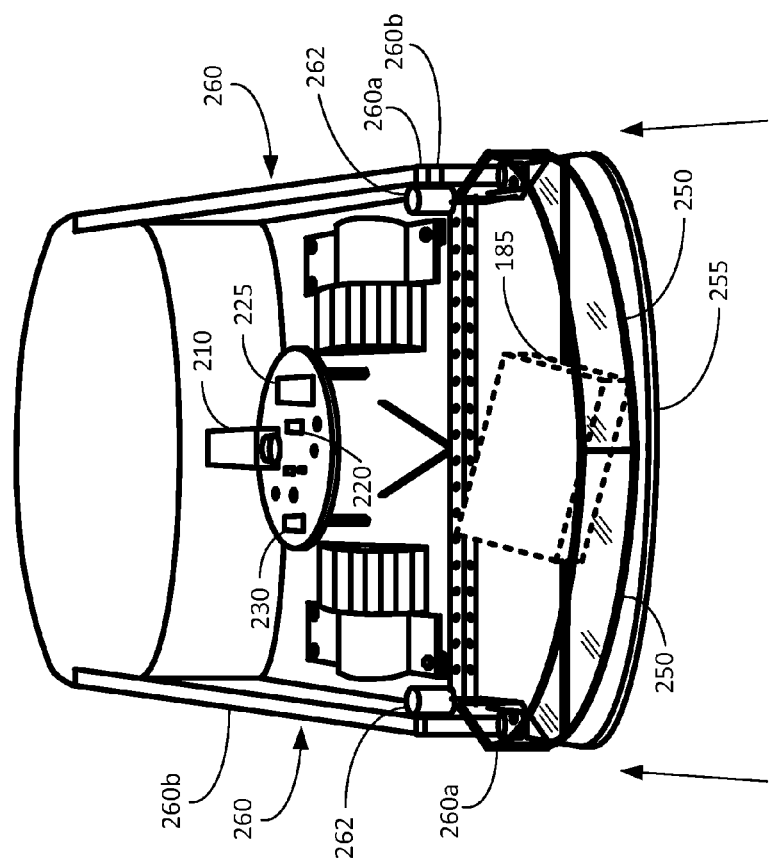
Figure 2G:
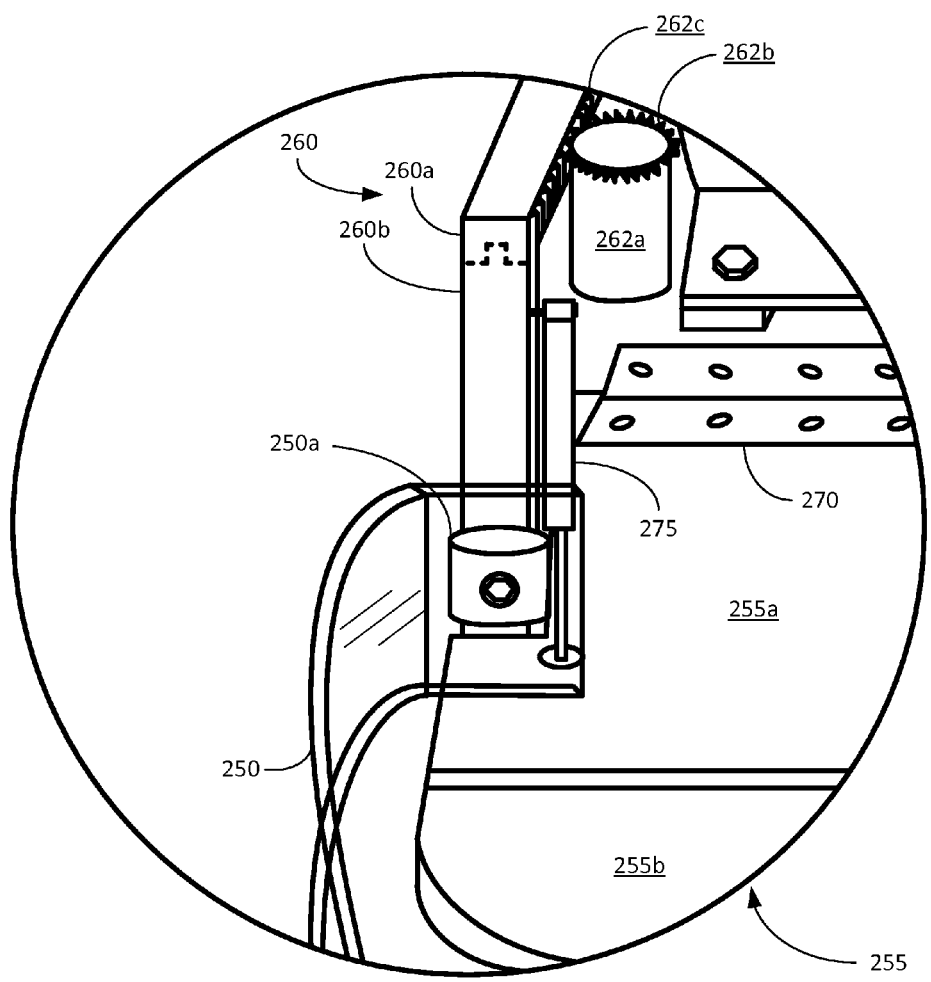
FIG. 2G is an isometric, detailed view of a gate actuator and a gate arm actuator on the cleaning robot of FIGS. 2A-2E, in accordance with some examples of the present disclosure.

In some examples, as shown in FIG. 2G, the gate arm actuators 262 can comprise a motor 262a and a drive, pinion gear 262b engaged with a driven, rack gear 262c, with the latter mounted on the upper gate arm 260a. As shown in detail in FIG. 2H, the gate arms 260 can comprise an upper gate arm 260a and a lower gate arm 260b. The upper gate arm 260a and the lower gate arm 260b can be slideably coupled to enable the upper gate arm 260a (and the gate 250) to move between the extended position and the retracted position. In some examples, the lower gate arm 260b can comprise a tongue 266 in slideable engagement with a groove 264 on the upper beam 260a (or vice-versa). In some embodiments, the tongue 266 and groove 264 can be angled to prevent the upper 260a and lower beams 260b from becoming unintentionally disconnected.

In some examples, the upper beam 260a and gate actuator 250a can be coupled using an adapter arm 268. In some examples, as shown, the adapter arm 268 can be coupled to the upper beam 260a using a fastener 272 (e.g., a bolt, rivet, or pin); while in other examples, the upper beam 260a and adapter arm 268 can be integral (i.e., can be cast, forged, or machined from a single piece of metal). In some examples, the adapter arm 268 can also be coupled to the gate actuator 250a using a fastener 276. Of course, other means, such as a mounting bracket, cable tie, or clamps could be used and are contemplated herein. As mentioned above, the gate actuator 250a can comprise, for example, a servo motor, stepper motor, vacuum actuator, or other suitable rotary actuator.

In some examples, the gate actuator 250a can also comprise a mounting adapter 274 to enable the gate 250 to be connected to the shaft of the gate actuator. The mounting adapter 274 can comprise a splined hole 274a, for example, to engage with a splined shaft on the gate actuator 250a. In some examples, the gate 250 can, in turn, be mounted to the mounting adapter 274 with one or more fasteners 278. In this manner, the gate 250 can be moved between the retracted and extended positions by the gate arms 260 and can be rotated between the open and closed positions by the gate actuator 250a. Of course, other mechanical couplings could be used and are contemplated herein.

As shown in FIG. 2A, as the cleanup robot 160 approaches the location of the object 185, it can stop at an appropriate distance from the object 185. The cleanup robot 160 may judge this distance based on feedback from the camera 210, for example, or may simply stop at the closest fiducial marker 175. As shown in FIG. 2B, the cleanup robot 160 can then ensure it is facing the object 185, open the gates 250, and lower the carrying tray 255. As shown in FIG. 2C, the cleanup robot 160 can then move forward and/or extend the gate arms 260 approximately to the position of the object 185 or beyond the position of the object 185.

As shown in FIG. 2D, the cleanup robot 160 can then close the gates 250, substantially encircling the object 185. In some examples, such as when the object 185 is substantially centered with respect to the cleanup robot 160, the gates 250 can close substantially simultaneously. In other examples, such as when the object 185 is off center, or awkwardly positioned, the cleanup robot 160 can close the gates 250 one at a time, or in an alternating pattern, to manipulate the object 185 as the gates 250 close. As shown in FIG. 2E, when the object 185 is substantially encircled by the gates 250, the cleanup robot 160 can move forward and/or the gate arms 260 can retract, pulling the object 185 onto the carrying tray 255, and then raise the carrying tray 255 off the floor. In this manner, the object 185 can be carried by the cleanup robot 160 back to a predetermined location. In addition, the object 185 is retained on the carrying tray 255 by the gates 250 during transit.

In some examples, the cleanup robot 160 can also comprise one or more sensors 290 disposed in various locations on the cleanup robot 160 including, but not limited to, the gates 250 and the gate arms 260. In some examples, the sensors 290 can comprise, for example, cameras, proximity sensors, 3D depth sensors, laser scanners, bar code scanners, or other means to enable the cleanup robot 160 to inspect the object 185 prior to, or during retrieval. The sensors 290 can enable the cleanup robot 160 to read the bar code on the object 185, for example, to determine whether it is trash or merchandise, and what type of merchandise it is. This can also enable the cleanup robot 160 to determine if the object 185 is too large or awkward to be automatically retrieved (or retrieved at all), how to best approach retrieving the object 185, and whether the object 185 is likely to topple or roll during retrieval and transit, among other things. In still other embodiments, the sensors 290 can enable the cleanup robot 160 to detect when one of the gates 250, for example, has come into contact with the object 185. This can enable the cleanup robot 160 to stop and reposition, as necessary, when retrieving an object 185.

As shown in detail in FIG. 2F, in some examples, the gates 250 can comprise a main portion 285—defining one or more slots 285a—and an edge strip 280. In some embodiments, as mentioned above, the main portion can comprise a piece of curved, substantially rigid material, such as Plexiglas® or Lexan®. Of course, other configurations could be used, such as straight or multi-piece designs, depending on the shape and size of the objects to be retrieved, among other things.

The edge strip 280 can comprise, for example, a substantially rigid carrier 280a and a resilient plastic or rubber edge 280b mounted in the slots 285a in the lower portion of the gates 250. As the gates 250 move across an irregular surface, therefore, the edge strip 280 can both move up and down in the slots 285a and deform along the bottom to conform to the warehouse floor 170. In some examples, the resilient edge strip 280b can comprise, for example, silicone, rubber, or plastic. In other examples, the resilient edge strip 280b can comprise a smooth surface, a serrated surface, bristles, or a combination thereof. In some examples, the carrier 280a can comprise a plastic holder and the resilient edge strip 280b can comprise nylon bristles. The edge strip 280 can improve the interface between the floor and the gates 250 to enable the gates 250 to move thin or difficult objects such as, for example, paper.

As shown in detail in FIG. 2G, in some examples, the carrying tray 255 can comprise a forward portion 255b and a rear portion 255a. The rear portion 255a can be relatively stiff (e.g., aluminum, plastic, or steel) and can be coupled to the cleanup robot 160 with a hinge 270, or other suitable pivoting interface. This can enable the carrying tray 255 to be pivoted from a raised position, in which the carrying tray 255 is substantially parallel to the floor, and a lowered position. The forward portion 255b, on the other hand, can be somewhat more resilient (e.g., plastic, silicone, or rubber) to enable the forward portion 255b of the carrying tray 255 to substantially conform to the floor of the warehouse 170.

The cleanup robot 160 can further comprise one or more carrying tray actuators 275 to move the carrying tray 255 between the raised position and the lowered position. In some examples, the carrying tray actuator 275 can comprise a linear actuator pivotally coupled to the chassis of the cleanup robot 160 on a first end and the carrying tray 255 on a second end. The carrying tray actuator 275 can comprise, for example, an electric solenoid, a hydraulic cylinder, or a pneumatic cylinder. When moved to the lowered position, therefore, the rear portion 255a of the carrying tray 255 pivots about the hinge 270, while the forward portion 255b deflects to conform to the floor and to provide a smooth transition from the floor to the carrying tray 255.

As shown in FIGS. 3A-3E, in some examples, the cleanup robot 160 can be powered by one or more energy sources 182. The energy sources 182 can comprise, for example, batteries or capacitors. In some examples, the energy sources 182 can comprise lead acid, lithium ion, or nickel-cadmium (NiCad) batteries. In some examples, the warehouse 170 can include docking stations or other facilities to enable the energy sources 182 to be replaced/recharged. In some examples, the cleanup robots 160 may return to the docking station periodically (e.g., once per hour) to recharge, update software, and/or perform other maintenance operations.

Figure 3A:
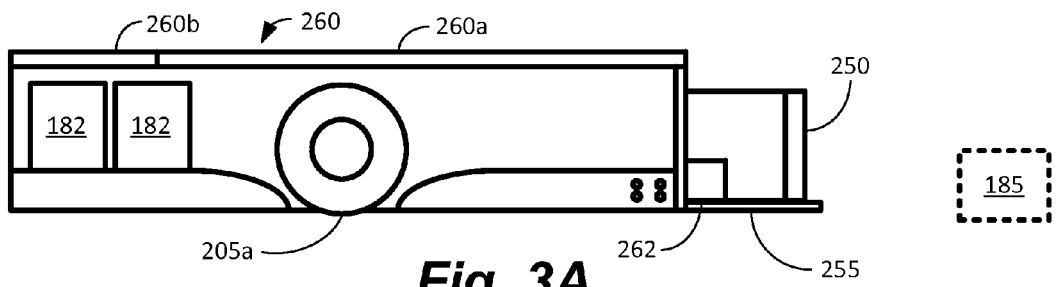
FIGS. 3A-3E are side views of a cleaning robot retrieving an object, in accordance with some examples of the present disclosure.
Figure 3B:
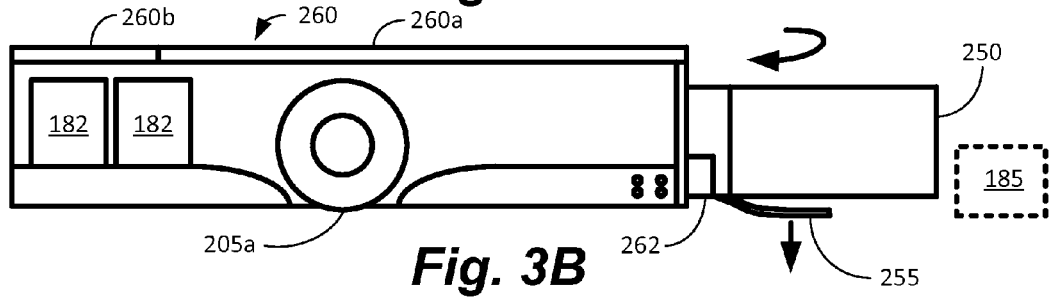
Figure 3C:
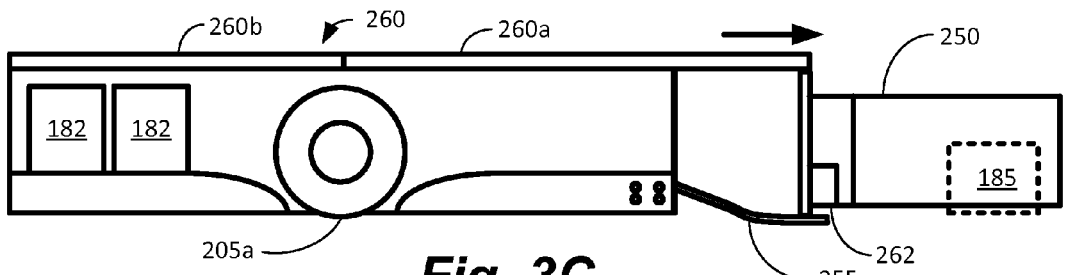

As shown in side view in FIG. 3A, as the cleanup robot 160 approaches the location of the object 185, it can stop at an appropriate distance from the object 185 with the gates 250 closed and the carrying tray 255 in the raised position. As shown in FIG. 3B, the cleanup robot 160 can then ensure it is facing the object 185, open the gates 250, and lower the carrying tray 255. As shown, the rear portion 255a substantially pivots about the hinge 270, while the forward portion 255b bends, or deforms, to form a substantially smooth transition between the carrying tray 255 and the floor. The cleanup robot 160 can then move forward and/or, as shown in FIG. 3C, extend the gate arms 260a to substantially encircle the object 185.

Figure 3D:
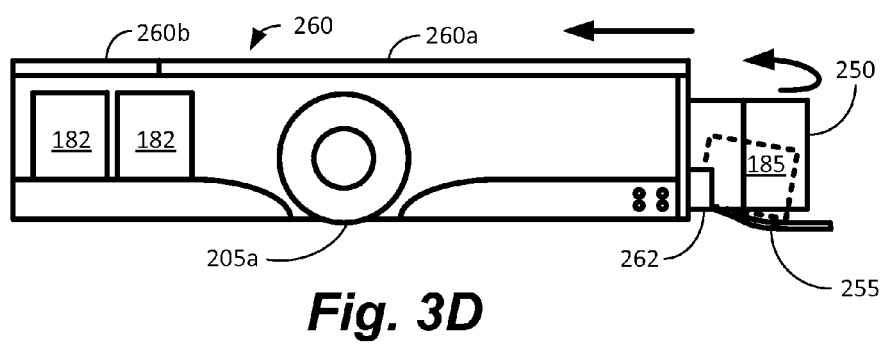
Figure 3E:
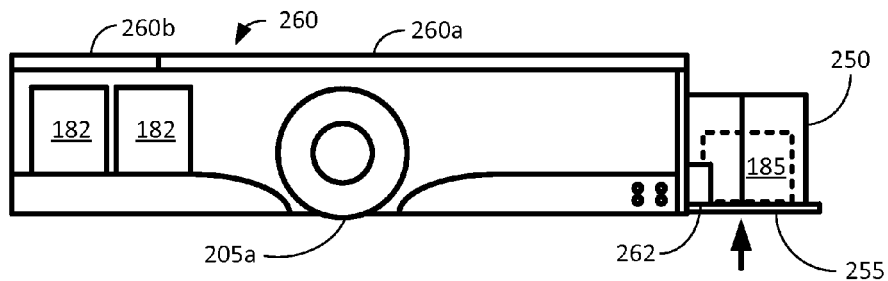

As shown in FIG. 3D, the cleanup robot 160 can then close the gates 250, encircling the object 185, and retract the gate arms 260a to pull the object 185 onto the carrying tray 255. As shown in FIG. 3E, when the object 185 has been sufficiently retracted onto the carrying tray 255, the carrying tray actuator 275 can pull the carrying tray 255 into the raised position. In this manner, the object 185 is retained on the carrying tray 255 by the gates 250 and the carrying tray 255 is substantially prevented from contacting the floor during transit.

Figure 4A:
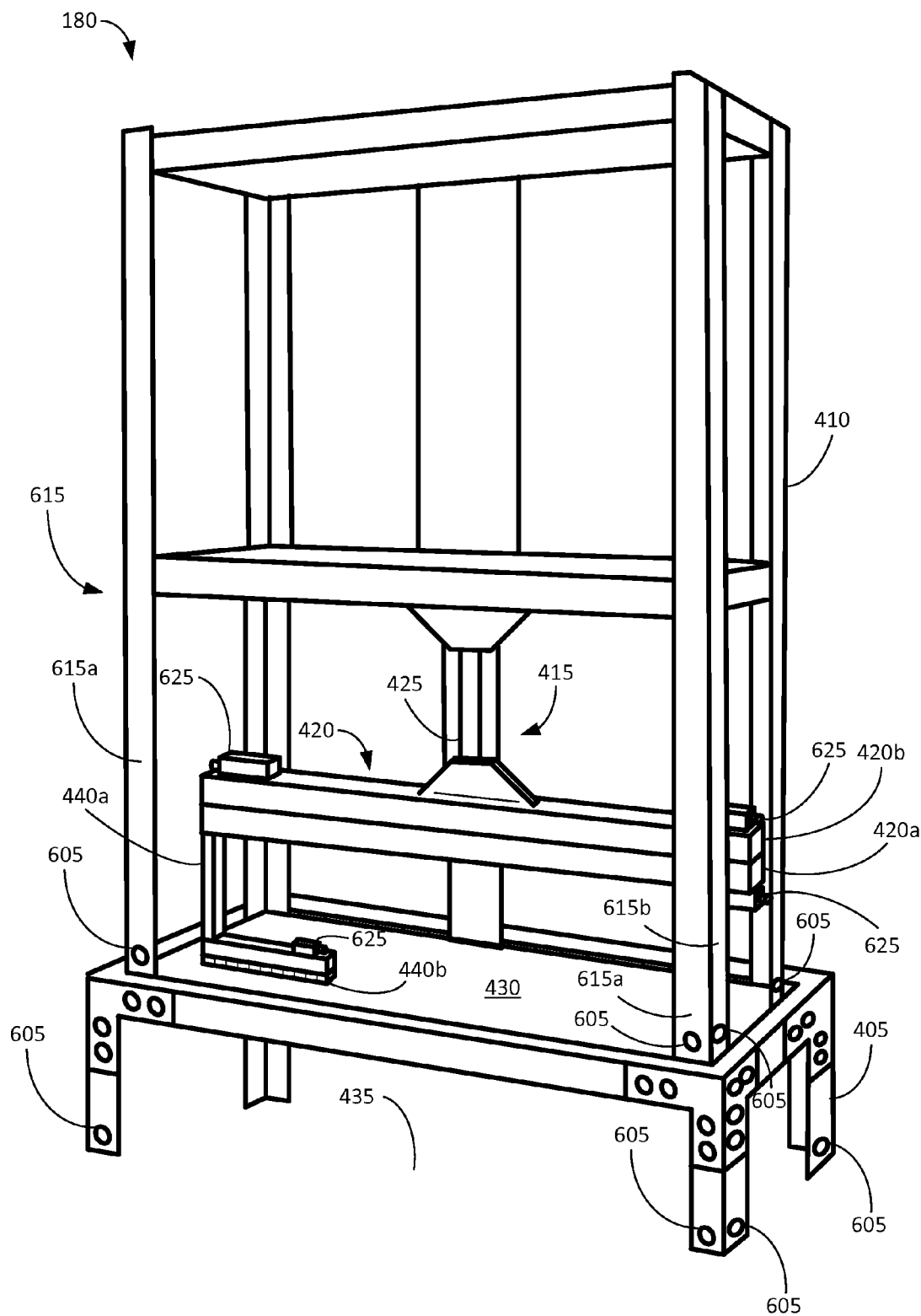
FIGS. 4A and 4B are isometric, front views of a cleanup pod in the raised and lowered position, respectively, in accordance with some examples of the present disclosure.
Figure 4B:
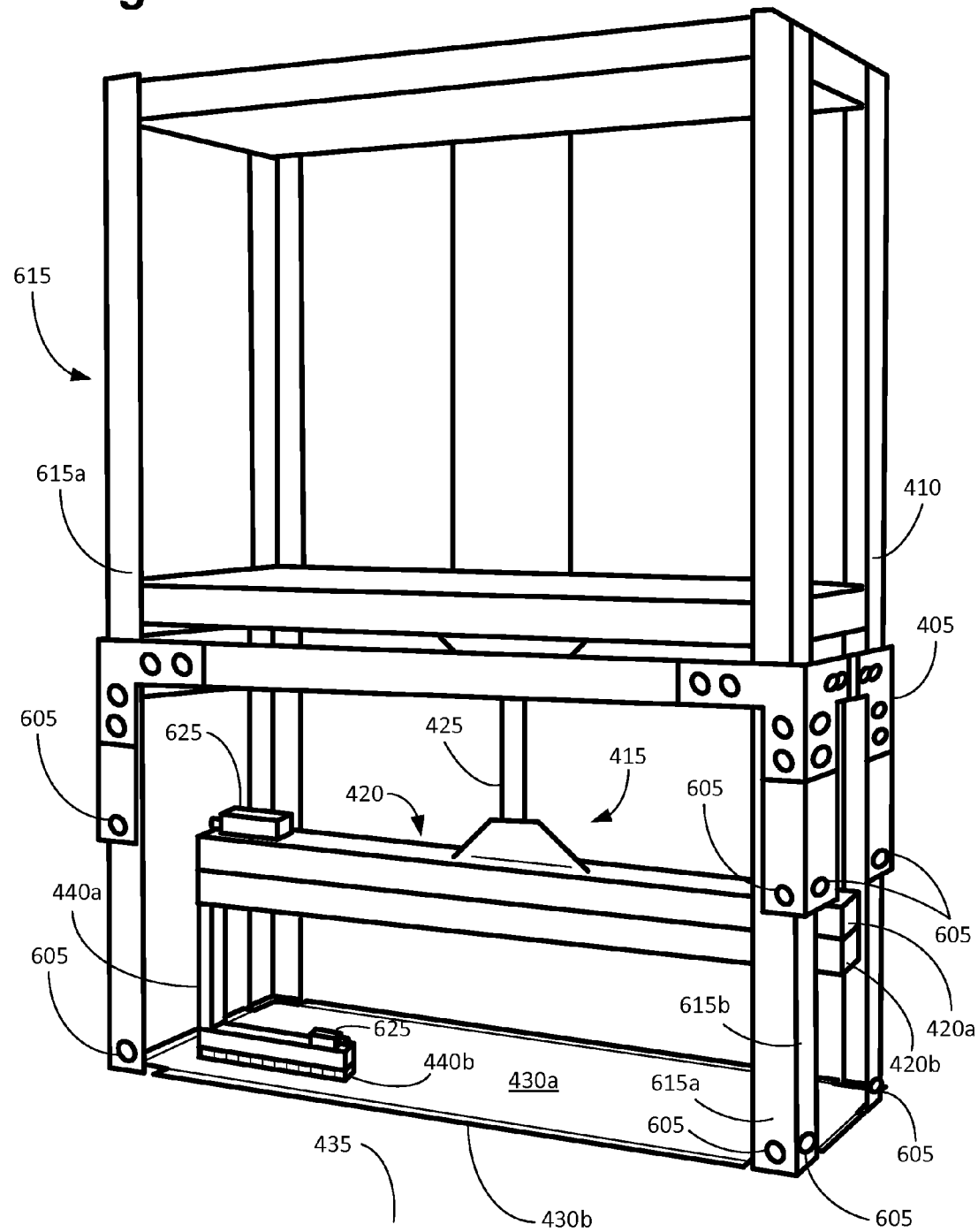

As shown in FIGS. 4A-4B, in other embodiments, the system can comprise a cleanup pod 180. The cleanup pod 180 can comprise a shelving unit, similar to an inventory holder 130, but comprising additional features. The cleanup pod 180 can be substantially rectangular, as shown, or can be square, or many other shapes depending, for example, on the shape of existing shelving units in the warehouse, the space available for storing the cleanup pod 180, and the size and shape of objects to be retrieved, among other things. If the inventory holders 130 in a particular inventory control system are square, for example, the cleanup pod 180 can also be square to facilitate storage and transportation by existing warehouse robots 120.

In some examples, the cleanup pod 180 can comprise a telescoping shelving structure comprising a base 405 and an upper frame 410. The base 405 and upper frame 410 can be in slideable engagement using, for example, tracks, ball bearing slides, or other suitable mechanisms. In some examples, the base 405 and/or upper frame 410 can comprise one or more servo motors, linear actuators, or other means to move the base 405 and upper frame 410 relative to each other. In some examples, the base 405 can comprise a motor with a pinion gear and the upper frame 410 can comprise a rack gear, or vice-versa.

In this manner, the cleanup pod 180 can have a raised position (FIG. 4A) in which the weight of the cleanup pod 180 is supported by the base 405 and a lowered position (FIG. 4B) in which the upper frame 410 is lowered to floor level and the base 405 is raised. In the lowered position, the carrying tray 430 and robotic arm 415, discussed below, can be lowered to the warehouse floor 435 level to enable objects 185 to be pulled onto the carrying tray 430. In the raised position, on the other hand, space is provided below the cleanup pod 180 to enable a warehouse robot 120 to pick up and carry the cleanup pod 180, as required.

In some examples, the cleanup pod 180 can comprise a carrying tray 430 and a robotic arm 415. In some examples, the carrying tray 430 can comprise a relatively flat surface 430a with tapered, deformable, or downturned edges 430b. In some examples, the flat surface 430a can comprise, for example, a steel, aluminum, or plastic surface that is relatively stiff, while the edges 430b can be somewhat more flexible. In some examples, the flat surface 430a and deformable edges 430b can comprise different materials; while in other examples, the flat surface 430a and deformable edges 430b can comprise the same material of the same or different thicknesses. In some cases, the deformable edges 430b can be thinned or tapered, for example, to improve flexibility and ease the transition of objects 185 from the warehouse floor 435 to the carrying tray 430. In this manner, when the carrying tray 430 is lowered to the warehouse floor 435, the deformable edges 430b can conform to irregularities in the warehouse floor 435 providing a substantially smooth transition from the warehouse floor 435 to the carrying tray 430.

The cleanup pod 180 can also comprise a robotic arm 415. The robotic arm 415, or other similar mechanism, can enable the cleanup pod 180 to retrieve objects 185 on the warehouse floor 435 within a predetermined radius or distance of the cleanup pod 180. In some examples, as shown, the robotic arm 415 can comprise two beams 420 in slideable engagement, both mounted on a rotating turret 425. In this manner, the turret 425 can enable the robotic arm 415 to rotate about the vertical y-axis and translate along the horizontal x-axis via the sliding beams 420. In some examples, the robotic arm 415 can be rotatable through 360 degrees to enable the robotic arm 415 to retrieve objects 185 within reach of the robotic arm 415 regardless of their orientation to the cleanup pod 180 (e.g., in front, behind, or to either side of the cleanup pod 180).

In some examples, the upper beam 420a can be rigidly mounted to the rotating turret 425, while the lower beam 420b can be mounted on tracks in slideable engagement with the upper beam 420a. In other embodiments, the upper beam 420a can be in slideable engagement with the turret 425, while the lower beam 420b is in slideable engagement with the upper beam 420a. This can increase the reach of the robotic arm 415, among other things. In this manner the upper beam 420a and/or lower beam 420b can move from a retracted position to an extended position to retrieve items in many positions proximate the cleanup pod 180 (e.g., within the predetermined radius or distance of the robotic arm 415). The turret 425 and beams 420 can each comprise, for example, an electric, hydraulic, or pneumatic motor or actuator to provide the necessary movement. In some examples, the turret 425 and beams 420 can each comprise one or more servo motors to provide accurate placement of the robotic arm 415. Of course, while disclosed herein with sliding beams, in still other examples, the robotic arm 415 could comprise, for example, telescoping arms, scissor arms, hydraulic or pneumatic rams, multi-joint arms, or other mechanisms that enable the robotic arm 415 to move between the retracted position and the extended position.

In some examples, the robotic arm 415 can further comprise an end effector 440 rotatably mounted to the lower beam 420b. In some examples, as shown, the end effector 440 can comprise a vertical arm 440a with a horizontal arm 440b, such as a brush or squeegee, mounted at the end of the arm 440a. In some examples, the end effector 440 can also rotate about the vertical y-axis from the end of the lower beam 420b. In this manner, the lower beam 420b can be extended with the end effector 440 in line with the lower beam 420b, for example, and then the end effector 440 can be rotated to partially encircle, or capture, the object 185 to retrieve it. The lower beam 420b can then be retracted to pull the object 185 onto the carrying tray 430. In still other embodiments, the end effector 440 can also translate along the lower beam 420b, providing additional control.

In some examples, the cleanup pod 180 can also comprise one or more imaging devices or cameras. In some examples, the cleanup pod 180 can comprise one or more leg cameras 605 located on the legs of the upper frame 410, base 405, or both. In some examples, the leg cameras 605 can be located on a first face 615a, a second face 615b, or both of the legs 615 of the upper frame 410, base 405, or both. In some examples, a leg camera 605 can be mounted on each leg, one in each direction (forward, backward, right, and left) to provide a complete view around the cleanup pod 180. In other embodiments, a leg camera 605 can be located in both the first face 615a and the second face 615b of each leg 615 (eight leg cameras 605 total) to, for example, provide stereoscopic views in all directions or provide additional views to compensate for a leg camera 605 that is temporarily blocked. The leg cameras 605 can enable the cleanup pod 180, central control 115, or an operator to monitor the commute to the object 185, identify the actual location and position of the object 185, and retrieve the object, among other things.

In some examples, the leg cameras 605 located on the base 405 can be used during transport by a warehouse robot 120. In other words, because the leg cameras 605 located on the base 405 are proximate the floor 435 when the cleanup pod 180 is in the raised position, they can provide a floor level view when the cleanup pod 180 is being moved by the warehouse robot 120. When the cleanup pod 180 is in the lowered position, on the other hand, the leg cameras 605 disposed on the upper frame, in concert with the arm cameras 625 located on the robotic arm (discussed below) can provide imagery.

In other examples, the cleanup pod 180 can also include one or more arm cameras 625 located on the robotic arm 415. In some examples, this can include one or more arm cameras 625 mounted on the beams 420. For instance, in some examples, an arm camera 625 can be mounted on the upper beam 420a, the lower beam 420b, or both. In some examples, the cleanup pod 180 can comprise one or more cameras 625 located on the lower portion of the lower beam to provide a view from the perspective of the robotic arm 415. In other examples, an arm camera 625 can also be mounted on a portion of the end effector 440. The arm camera 625 can be mounted on the horizontal arm 440b of the end effector, for example, to enable the cleanup pod 180, central control 115, or an operator a view of the area in front of the end effector 440. This can enable the operator to locate and manipulate the object 185 onto the carrying tray 430, for example, or to avoid inventory holders 130 and other items in close proximity to the object 185 being retrieved.

Figure 4C:
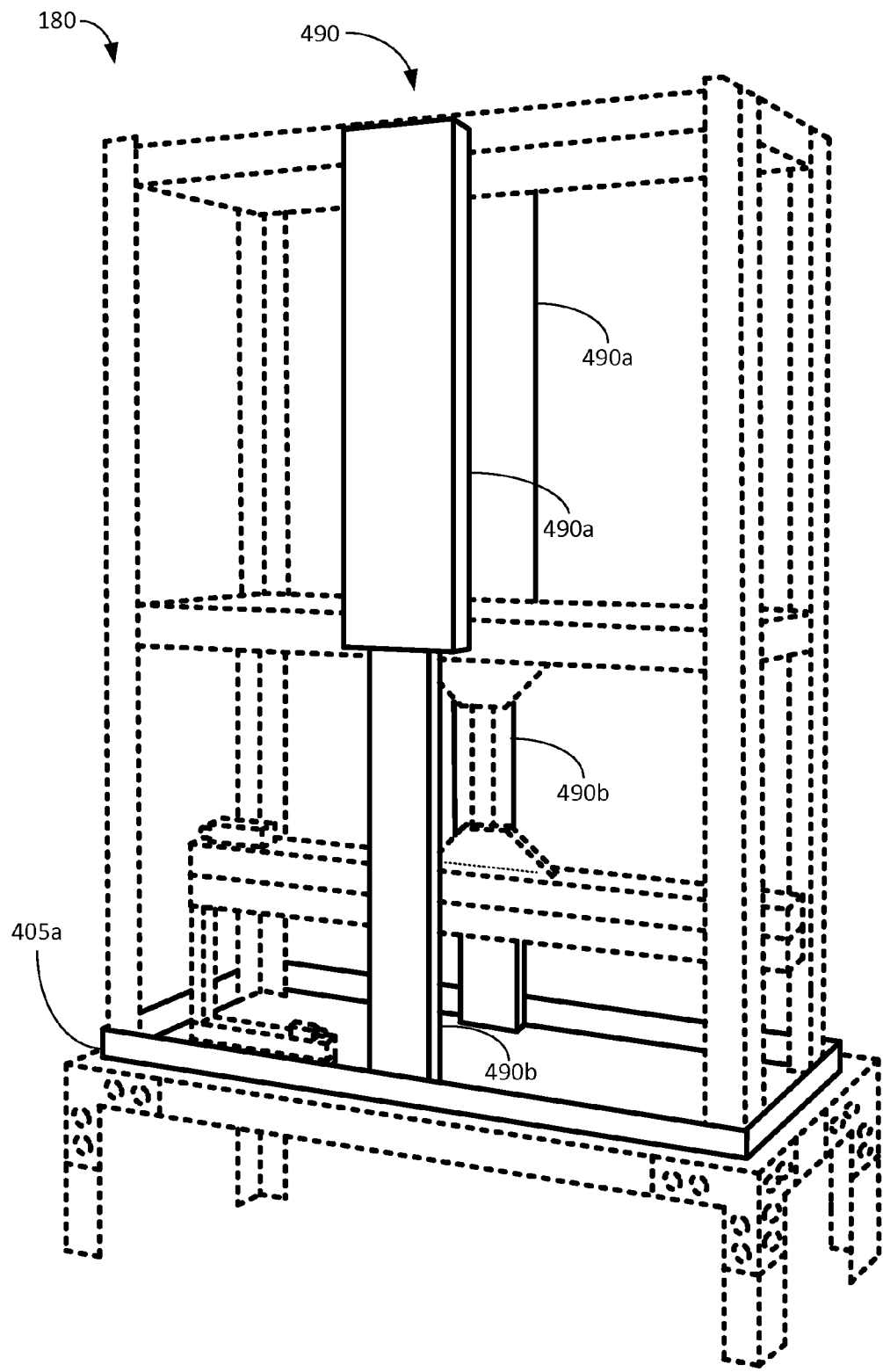
FIG. 4C is an isometric, front view of a cleanup pod highlighting a fence on the base and linear actuators, respectively, in accordance with some examples of the present disclosure.

In some examples, as shown in FIG. 4C, the base 405 can further comprise a fence 405a. The fence 405a can comprise a lip or edge disposed around the perimeter of the base 405. As shown, when the cleanup pod 180 is in the raised position, therefore, the bottom of the fence 405a can be substantially even with a plane defined by the surface 430a of the carrying tray, while the top of the fence 405a can be disposed above the plane. In this manner, objects 185 that have been retrieved and are being carried on the carrying tray 430 can be prevented from falling off of the cleanup pod 180.

The base 405 and the upper frame 410 can be moved between the raised position and the lowered position using a number of mechanisms. In some examples, as shown, the base 405 and the upper frame 410 can be moved using one or more linear actuators 490. In some examples, the linear actuators 490 can comprise an upper, drive portion 490a coupled to the upper frame 410 and a lower, driven portion 490b coupled to the base 405. In this configuration, when the drive portion 490a raises the driven portion 490b, the base 405 is raised off of the ground, and the upper frame 410 (and the robotic arm, etc.) is lowered to the ground. Of course, other mechanisms, such as belt, chain, or gear drives, pneumatic or hydraulic cylinders, or servo motors could be used and are contemplated herein.

Figure 5A:
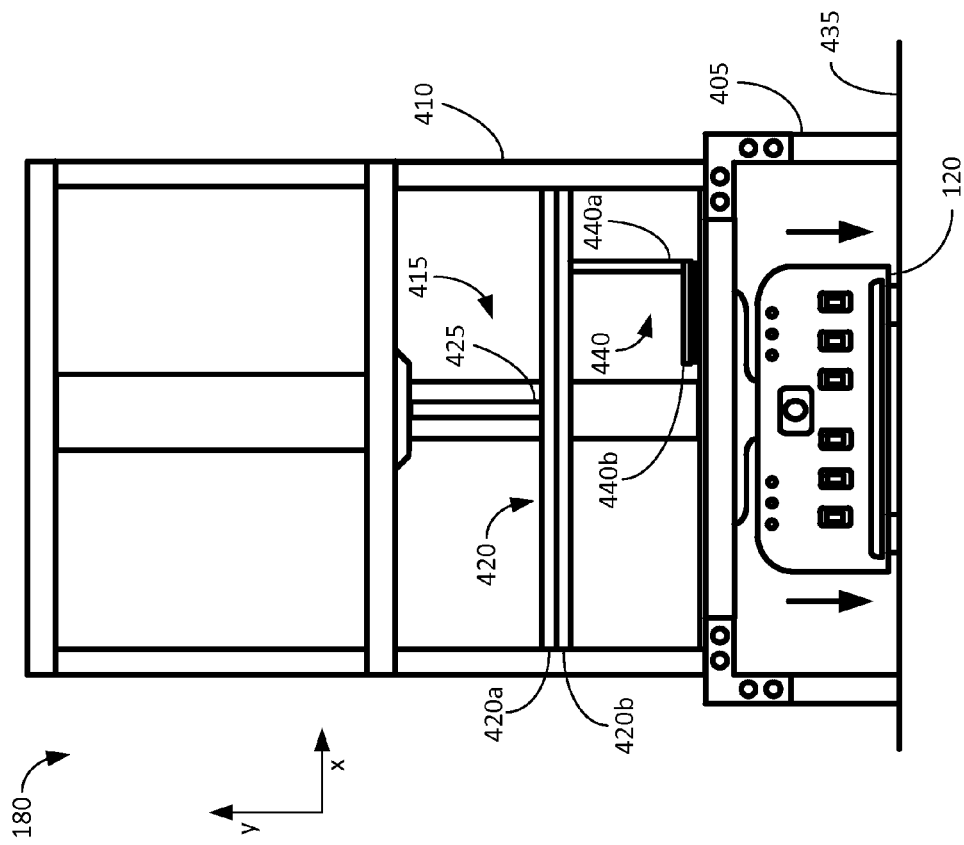
Figure 5B:
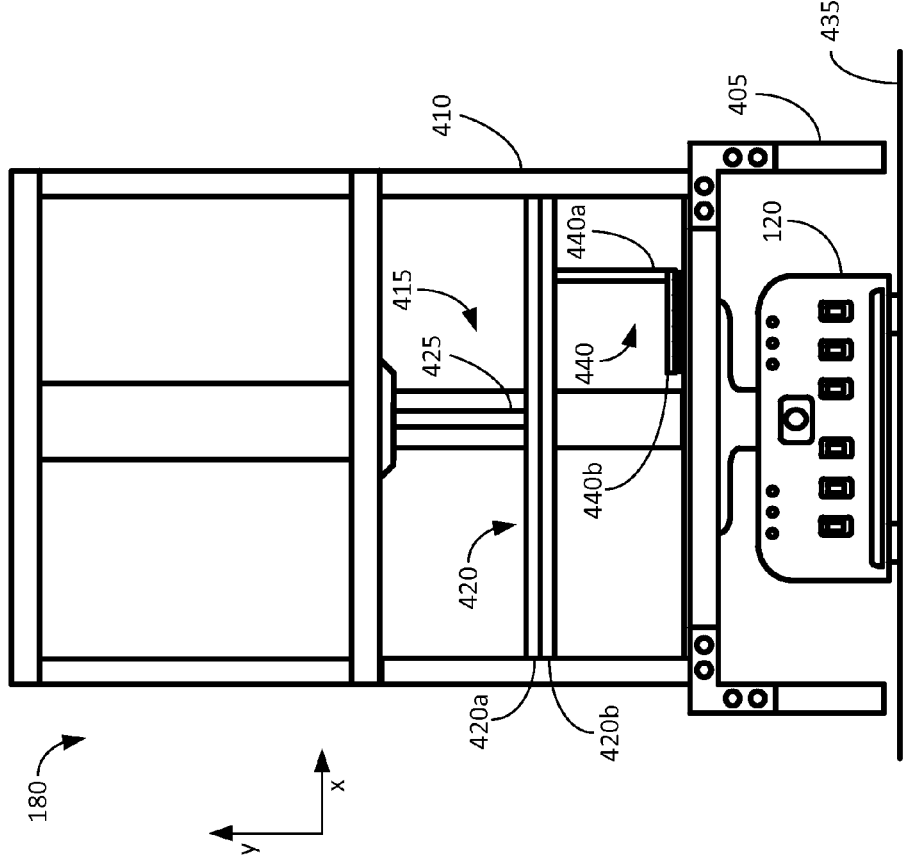

In use, as shown in FIG. 5A, in the raised position, warehouse robots 120 can move under, lift, and carry the cleanup pod 180 in the same manner as with an inventory holder 130. As shown in FIG. 5B, when the warehouse robot 120 has moved the cleanup pod 180 to within a predetermined distance of the object 185—one fiducial marker 175 or one grid 175a away, for example—the warehouse robot 120 can lower the cleanup pod 180 to the warehouse floor 435, with the cleanup pod 180 still in the raised position. After lowering the cleanup pod 180, the warehouse robot 120 can then move to another location (e.g., transport an inventory holder 130 to a workstation 150), while the cleanup pod 180 retrieves the reported object 185.

As shown in FIG. 5C, the cleanup pod 180 can then move to the lowered position by lowering the upper frame 410, raising the base 405, or a combination thereof. In the lowered position, in addition to lowering the upper frame 410 to warehouse floor 435, the carrying tray 430 and robotic arm 415 are also lowered to warehouse floor 435. As mentioned above, in some examples, the edges 430b of the carrying tray 430 can deform slightly to form a substantially smooth interface, or ramp, between the warehouse floor 435, including any irregularities, and the carrying tray 430.

Figure 5D:
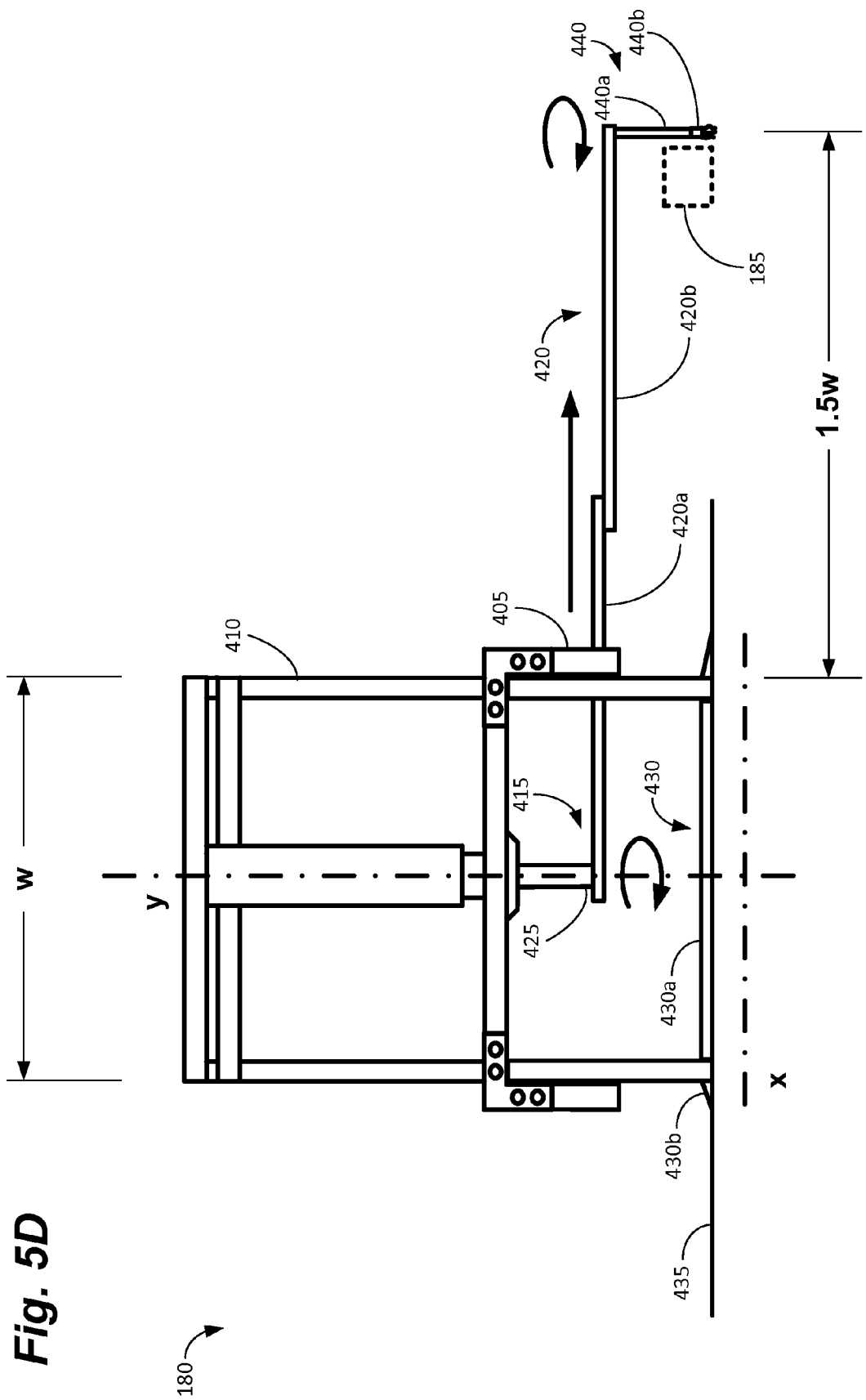

As shown in FIG. 5D, the robotic arm 415 can rotate about the vertical y-axis to properly orient the beams 420 with the object 185. In other words, the turret 425 can rotate until the beams 420 are relatively in line with the object 185 based on the positon of the object 185 relative to the cleanup pod 180 (e.g., in front, behind, or to either side). Perfect alignment is not required, however, but once relatively lined up with the object 185, the upper beam 420a and/or lower beam 420b can traverse toward the object 185 along the horizontal x-axis. The upper beam 420a and/or the lower beam 420b can enable the robotic arm 415 to extend past the upper frame 410 to reach the object 185 on the warehouse floor 435.

The overall length and reach of the beams 420 can determine the placement of the cleanup pod 180 with respect to the object. In some examples, the upper beam 420a and lower beam 420b can each be approximately the same width as the upper frame 410 or the base 405 ("w"), whichever is wider. In this manner, the length of the beams 420 is maximized, yet the beams 420 do not protrude from the sides of the cleanup pod 180 in transit. In this configuration, when both beams 420 are moveable, as shown, the robotic arm 415 can provide a reach beyond the base 405 and upper frame 410 of approximately 1.5 times the width of the upper frame 410 or base 405 (~1.5w). Once extended, the end effector 440 can be rotated to capture the object 185. As discussed below, in some examples, the end effector 440 can comprise a deformable strip 450 to enable the end effector 440 to retrieve even thin or flimsy objects 185, such as paper, plastic wrap, or foam, for example.

As shown in FIG. 5E, the beams 420 can then be retracted, pulling the object 185 onto the carrying tray 430. In some examples, the end effector 440 can be manipulated during the retrieval process to steer the object 185 as necessary. In other words, because the horizontal arm 440*b* can be rotated, it can be used to change the direction or position of the object 185 as it is being pulled in to steer the object 185 around obstacles or inventory holders 130, for example, or simply to align the object 185 with the carrying tray 430. As shown in FIG. 5F, the cleanup pod 180 can then be returned to the raised position and picked up by a warehouse robot 120.

The warehouse robot 120 can then transport the cleanup pod 180 to an appropriate location based on the object 185. If the object 185 is trash, for example, the warehouse robot 120 can take the cleanup pod 180 to a trash receptacle or a work station 150 for removal by a worker. If, on the other hand, the object 185 is merchandise, the warehouse robot 120 can take the cleanup pod 180 to a work station 150 to enable a worker to inspect and/or restock the object 185. If the object 185 is damaged because it has been run over by another robot, for example, the object 185 may be discarded, donated to charity, or returned to the manufacturer. If the object 185 is not damaged, on the other hand, the object 185 can be restocked.

Figure 6:
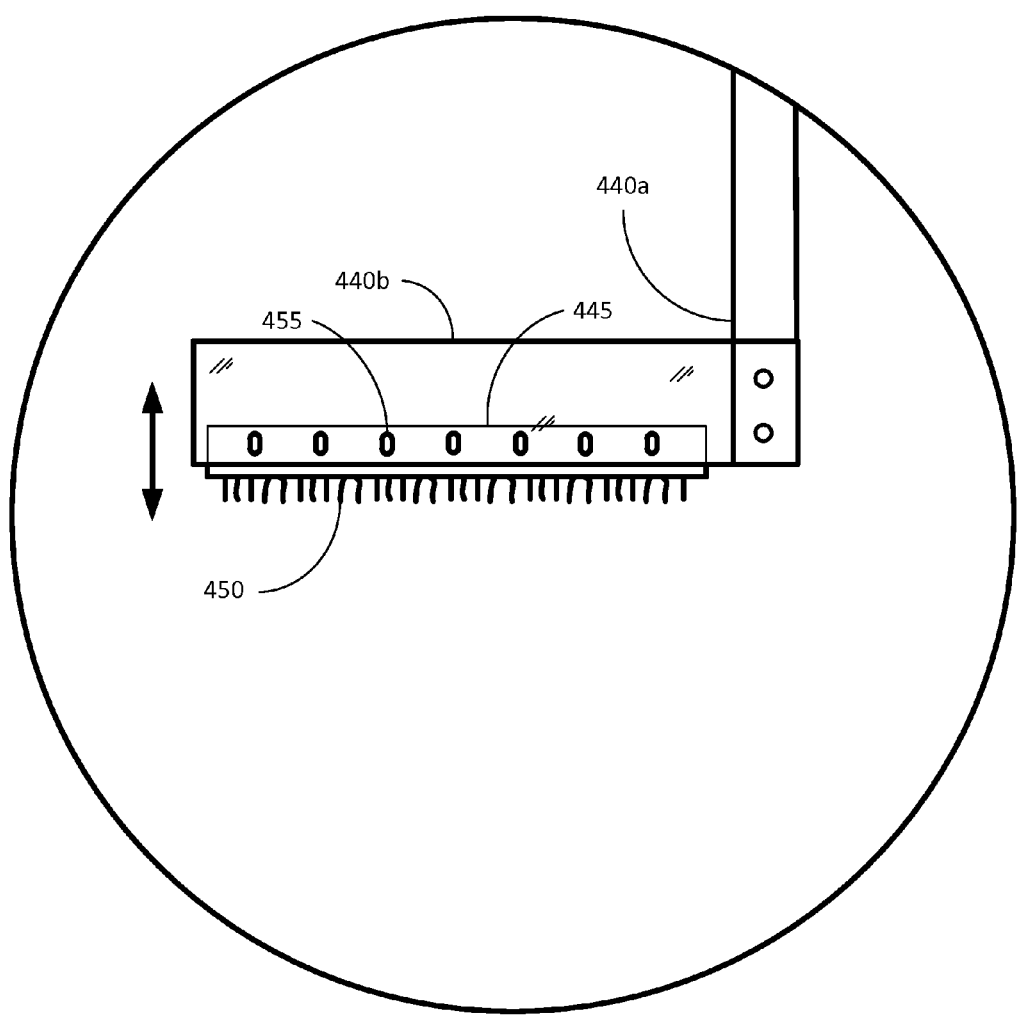
FIG. 6 is a front, detailed view of an end effector of the cleanup pod of FIGS. 5A-5F, in accordance with some examples of the present disclosure.
Figure 7:
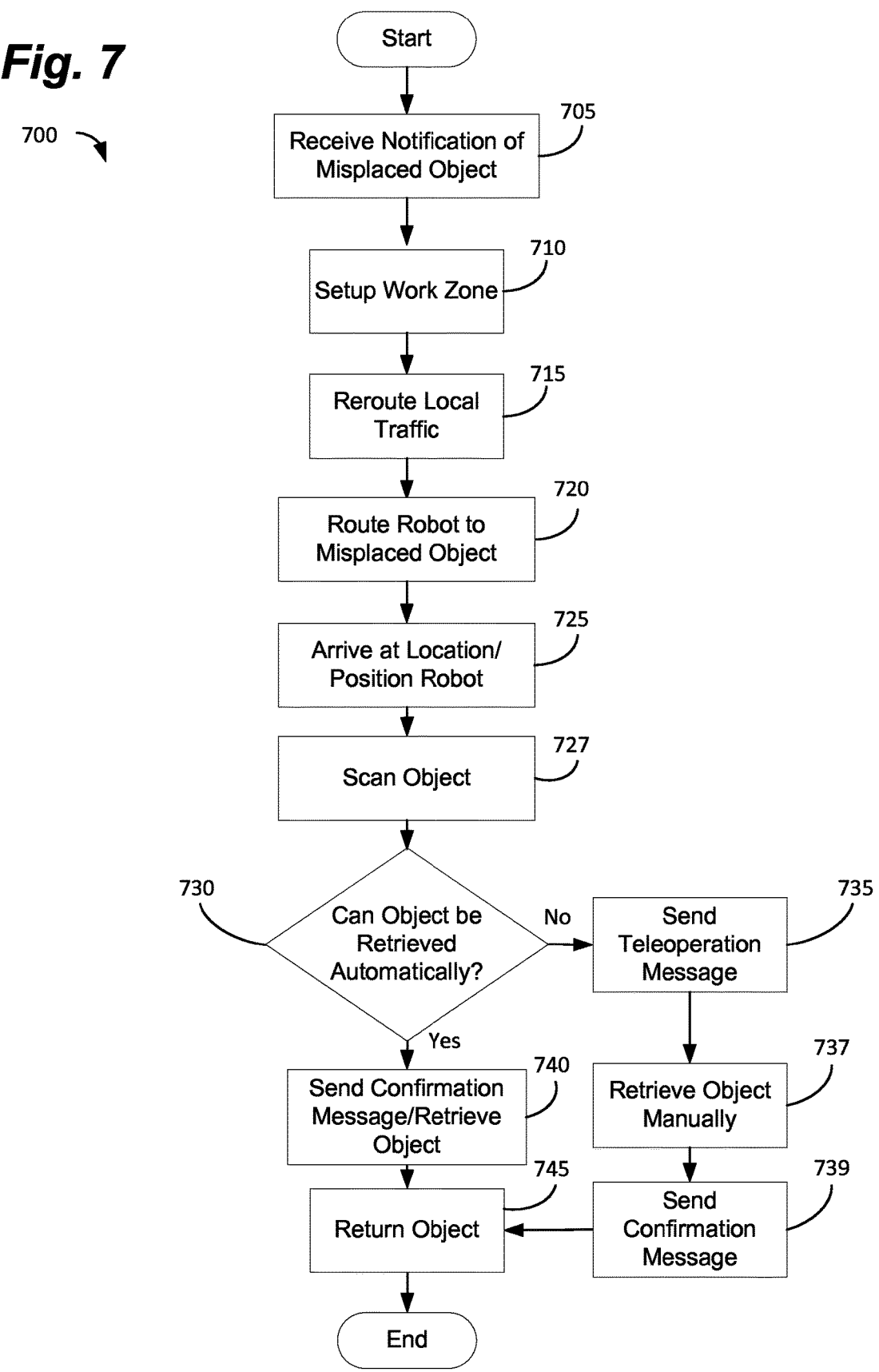
FIG. 7 is a flow diagram of a process for retrieving objects in a warehouse using a cleaning robot, in accordance with some examples of the present disclosure.

In some examples, as shown in detail in FIG. 6, the horizontal arm 440*b* of the end effector 440 can further comprise a holder 445 and a brush, squeegee, or other deformable strip 450. In some examples, the deformable strip 450 can comprise a flexible substrate, such as rubber or silicone, to enable the deformable strip 450 to bend and conform to the floor along its length. In some examples, the deformable strip 450 can be mounted to the holder 445, which can comprise a substantially rigid plastic or metal strip, for example, mounted to the horizontal arm 440*b* using a plurality of slotted mounting holes 455 and fasteners (e.g., bolts, screws, pins, or rivets). In this manner, the holder 445 can move vertically within the horizontal arm 440*b*, while the deformable strip 450 can deform separately to conform to irregularities in the warehouse floor 435. In this manner, the end effector 440 can retrieve very thin or difficult-to-grasp items such as, for example, pieces of paper, without needing to apply undue pressure. In some examples, the deformable strip 450 can comprise a nylon brush, rubber or silicone strip, or other suitably flexible material.

Examples of the present disclosure can also comprise a method 700 for removing errant objects from a warehouse floor using a cleanup robot. At 705, the method 700 can begin with a notification that an object is out of place on the warehouse floor. The object can comprise many types of objects that have been misplaced or mishandled and are on the warehouse floor including, but not limited to, merchandise that has fallen out of a bin, trash, order sheets, billing paperwork, or even a hat from a warehouse employee.

In some examples, the notification can be provided to the aforementioned central control. In other embodiments, a separate control system for the cleanup robots can be used. Regardless, the notification can be entered by a worker who is on the floor, for example, or can be provided by a warehouse robot that has detected an object in its path. In some examples, the warehouse can include a plurality of reporting stations to provide a means for warehouse workers to report objects in the floor. In some examples, the reporting stations can comprise fixed or non-fixed computers, tablets, smart phones, touchscreens, or other suitable technology to enable workers to report misplaced objects on the warehouse floor. In some examples, as shown, the reporting stations can be fixed terminals located in multiple locations on the warehouse floor for this purpose. In other examples, the reporting stations can comprise cell phones, tablets, or other mobile devices carried by workers and in communication with the central control, or management module. In some examples, the notification can provide the location of the object by providing, for example, a grid number or fiducial number proximate the object. In other examples, the notification can include additional information such as, for example, the approximate size or dimensions of the object, the type of object (e.g., paper, merchandise, trash, etc.), and the time the object was discovered.

At 710, the central control can "quarantine" a predetermined safety area around the object. As mentioned above, the safety area can include one or more grids or fiducials to establish a virtual barrier around the object. In other words, the safety area can comprise a number of grids and/or fiducials, and the area defined by the grids or fiducials can be transmitted to the warehouse robots, for example, to route them around the area. This virtual boundary can prevent robots from running over the object, among other things, which can damage both the robots and the object. In some examples, the size of the safety area can correspond to the size of the object. As discussed below with reference to FIG. 9, the safety area can remain in place until the object has been removed.

At 715, the central control can reroute traffic as necessary to facilitate removal of the object. In some examples, this can include changing the route of any robot that is on an intersecting route with the safety area. In other embodiments, this can also include overriding existing traffic patterns to provide the shortest/fastest route for the cleanup robot to reach the object. In other words, if the object is a short distance down an aisle with a one-way traffic pattern in the opposite direction, the central control can override the traffic pattern to enable the cleanup robot to take the shortest route to the object. In this manner, the cleanup robot can be sent a short distance in the "wrong direction" to prevent it from "going around the block" to get to the object.

In some examples, the safety area may encompass the portion of the one-way traffic pattern, obviating the need for an override. In other words, if the portion of the one-way traffic pattern that is the "wrong way" is encompassed by the safety area, then no override is necessary because the cleanup robot is free to travel in any direction in a safety area anyway. In other examples, the method 700 can include establishing a second, moving safety area around the cleanup robot. Similarly to the safety area, the moving safety area can establish a safe area around the cleanup robot enabling it to move in any direction, regardless of established traffic patterns.

At 720, the central control can route a cleanup robot to the reported location for the object. This can include creating a route, for example, and then sending instructions to the cleanup robot to the location. In other embodiments, the central control can merely provide the location of the object to the cleanup robot, which can use wireless, GPS, or cellular location systems, along with navigational software, for example, to route itself to the object. As mentioned above, in some examples, the central control can reroute traffic and override traffic patterns as necessary to provide the cleanup robot with the most efficient/quickest route. In other examples, the cleanup robot can follow established traffic patterns to reduce traffic disruption in the warehouse.

At 725, the robot can arrive at the reported location and scan the area for the object. This can be done, for example, with a camera, scanner, or other sensor located on the robot. This can enable the cleanup robot to fine tune its location and position with respect to the object. In other words, the reported location may provide only an approximate location and may not include the orientation of the object. In some examples, the robot may also need to reposition itself slightly to compensate for the dimensions of the object. In other words, some objects may only fit on the cleanup robot widthwise or lengthwise, for example. The robot can use a camera, scanner, or other sensor, therefore, to maneuver towards and position or orient itself relative to the object for retrieval.

At 727, the robot can scan the object. This can include sending imagery from the onboard camera or other sensors to the central control for analysis. At 730, the robot can determine if the object can be removed (automatically or otherwise) or can receive analysis from the central control to that effect. In other words, in some cases, the object may be too bulky or heavy for the robot to carry. In other instances, the object may have already been removed by a worker. In still other cases, the object may be stuck to the floor, badly damaged, or otherwise difficult or impossible for the robot to retrieve. In still other examples, the robot may be unable to determine the shape or size of the object or how to retrieve the object.

At 735, if the robot determines it cannot retrieve the object, it can send a "teleoperation message" to the central control stating that it is unable to automatically retrieve the object. In this case, a worker in the control room can take over remote operation of the robot to retrieve the object. At 737, the worker can use the cameras on the robot to view the scene and manipulate the gates, gate arms, and carrying tray, for example, to maneuver the object onto the carrying tray. In some cases, the worker can use remote controls, similar to those used for radio controlled (RC) cars and planes, for example, in communication with the robot. At 739, if the worker successfully retrieves the object, the worker can send a message to the central control.

If the worker cannot manually retrieve the object using teleoperation, the object may then require a worker to walk out into the warehouse and physically retrieve it, for example, or for a different tool, such as a floor sweeper to be deployed. At 740, if the robot determined that it can retrieve the object, then the robot can send a message to the central control and proceed with the retrieval. As mentioned above, this can include "scooping" the object onto a carrying tray. Of course, other mechanical means such as a vacuum, magnet, robotic arm, or pincer could also be used and are contemplated herein.

At 745, regardless of the method of retrieval, the robot can then return the object to a predetermined location. If the object is merchandise, for example, the robot can return the merchandise to a work station 150 for inspection. If the object is determined to be sufficiently undamaged, the merchandise can be returned to the inventory holder from which it came, another inventory holder or any other appropriate location. In other examples, if the object is trash, it can be delivered to an appropriate area and disposed of directly, or transferred to a worker for disposal.

After returning the object, the cleanup robot can return to its normal location or another location, for example, or be routed to retrieve another object. In some examples, as shown in FIG. 1B, the cleanup robots may have a central storage location when not in use. This can enable the cleanup robots to recharge, receive updates, and/or complete other maintenance items. In other examples, the cleanup robots can be configured to park out of the way (e.g., under the inventory holders) to wait for the next assignment.

Examples of the present disclosure can also comprise a method 800 for removing errant objects from a warehouse floor with a cleanup pod using an existing, unmodified warehouse robot 120. At 805, the method 800 can begin with a notification that an object is out of place on the warehouse floor. As mentioned above, this can include a notification from a warehouse robot, a worker, or other source. In some examples, the notification can also include a timestamp and/or a location. At 810, the central control can establish a suitable safety area around the object. In some examples, the safety area for a cleanup pod can be larger, or can be offset, to account for the relatively long reach of the robotic arm of the cleanup pod. Similarly, in some examples, the central control can establish two safety zones: a first around the object and a second around the cleanup pod in transit or in use.

At 815, the central control can reroute traffic as necessary to facilitate removal of the object. Again, this can include changing the route of any robot that is on an intersecting route with the safety area. This can also include overriding existing traffic patterns, as necessary, to provide the shortest/fastest route for the cleanup pod to reach the object.

At 820, the central control can route a warehouse robot to retrieve the cleanup pod. This can include creating a route from the robot's current location to the cleanup pod. In some cases, the robot may need to complete its current task and then be routed to pick-up the cleanup pod. At 825, once the robot has retrieved the cleanup pod, the robot can then be routed to the reported area of the object. In some examples, the central control can provide all routing information to the robot. In other examples, some or all of the routing can be handled by systems onboard the robot. As mentioned above, in some examples, the central control can reroute traffic and override traffic patterns as necessary to provide the robot with the most efficient/quickest route. In other examples, the robot can follow established traffic patterns to reduce traffic disruption in the warehouse.

At 830, the robot can arrive at the reported location and drop off or place the cleanup pod. In some examples, the robot can place the cleanup pod within one fiducial or one grid of the object. In other embodiments, the robot can place the cleanup pod within reach of the object, which can vary based on the reach of the robotic arm on the cleanup pod.

At 835, the cleanup pod can move from the raised position to the lowered position and scan the area for the object. This can be done, for example, with a camera, scanner, or other sensor located the legs or robotic arm of the cleanup pod. This can enable the cleanup pod to rotate the robotic arm location and position with respect to the object. In other words, while the cleanup pod may have the reported location of the object, the object may be behind, to either side, or ahead of the cleanup pod depending on where the robot placed the cleanup pod and the direction from which the robot approached the area, among other things.

At 840, the cleanup pod can rotate and extend the robotic arm towards the object. In some examples, the cleanup pod can use the camera located on the robotic arm, one of more of the leg cameras, or other sensors, therefore, to maneuver the end effector up to the object for retrieval. At 842, the cleanup pod can scan the object. This can include sending imagery from one of the onboard cameras or other sensors to the central control for analysis. In some examples, the cleanup pod can provide some onboard analysis of the object using the onboard cameras or other sensors. In some examples, the cleanup pod can send approximate shape (e.g., a rough 3D shape), relative position, or other information associated with the object. In some examples, the relative position can comprise, for example, the location of the object relative to the cleanup pod (e.g., one foot in front and six inches to the right). In other examples, the relative position can include the attitude of the object (e.g., upright, on its side, upside down, etc.).

At 845, the cleanup pod can determine if the object can be removed (automatically or otherwise) or can receive analysis from the central control to that effect. In other words, in some cases, the object may be too bulky or heavy for the cleanup pod to carry. In other instances, the object may have already been removed by a worker. In still other cases, the object may be stuck to the floor, badly damaged, or otherwise difficult or impossible for the cleanup pod to retrieve. In still other examples, the cleanup pod may be unable to determine the shape or size of the object or how to retrieve the object.

In some examples, the cleanup pod or the central control can formulate a retrieval plan. In other words, the cleanup pod or central control can create an algorithm, including turret, upper/lower beam, and/or end effector movements to enable the object to be moved from the warehouse floor to the flat floor surface of the cleanup pod, for example. Examples of systems for devising similar robotic movements are disclosed in U.S. patent application Ser. No. 14/572,332 entitled, "ROBOTIC GRASPING OF ITEMS IN INVENTORY SYSTEM" and U.S. patent application Ser. No. 14/572,420 entitled, "GENERATING ROBOTIC GRASPING INSTRUCTIONS FOR INVENTORY ITEMS," both filed Dec. 16, 2014. Both applications are hereby incorporated by reference in their entirety.

At 850, if the cleanup pod determines it cannot retrieve the object, it can send a "teleoperation message" to the central control stating that it is unable to automatically retrieve the object. In this case, a worker in the control room can take over remote operation of the cleanup pod to retrieve the object. At 857, the worker can use the cameras on the cleanup pod to view the scene and manipulate the robotic arm, end effector, and carrying tray, for example, to maneuver the object onto the carrying tray. In some cases, the worker can use remote controls, similar to those used for radio controlled (RC) cars and planes, for example, in communication with the cleanup pod. At 859, if the worker successfully retrieves the object, the worker can send a message to the central control.

If the worker cannot manually retrieve the object using teleoperation, the object may then require a worker to walk out into the warehouse and physically retrieve it, for example, or for a different tool, such as a floor sweeper to be deployed. At 855, if the cleanup pod determined that it can retrieve the object, then the cleanup pod can send a message to the central control and proceed with the retrieval. As mentioned above, this can include pulling the object onto a carrying tray using the robotic arm and end effector. Of course, other mechanical means such as a vacuum, magnet, or pincer could also be used and are contemplated herein.

At 860, regardless of whether the object was manually or automatically retrieved, the central control can route the same warehouse robot or a different warehouse robot back to the cleanup pod 180 to retrieve it. In this manner, the robot can be performing other duties, or simply move out of the way, while the object retrieval is in process. At 865, the robot can then deliver the cleanup pod—and the object—to a predetermined location. If the object is merchandise, for example, the robot can return the cleanup pod to a work station 150 to enable the object to be inspected. If the object is determined to be sufficiently undamaged, the merchandise can be returned to the inventory holder from which it came, another inventory holder, or any other appropriate location. In other examples, if the object is trash, it can be delivered to an appropriate area and disposed of directly, or transferred to a worker for disposal.

At 870, the warehouse robot can then return the cleanup pod to its normal location or another location, for example, or be routed to retrieve another object. In some examples, as shown in FIG. 1B, the cleanup pods may have a specific storage location when not in use. Because the cleanup pods are substantially the same dimensions as the inventory holders, in some examples, the cleanup pods can simply be stored together with the inventory holders. In some examples, the cleanup pods can be recharged, updated, and otherwise maintained in their home locations.

Due to the modularity of the cleanup pods 180 and the inventory holders 130, the warehouse robots 120 can be used for multiple tasks. In some examples, as shown in FIG. 9, a warehouse robot 120 can be used to transport a cleanup pod on scene, retrieve an inventory holder (or perform other tasks) and then return to transport the cleanup pod 180 from the scene. In this manner, a single warehouse robot 120, or type of warehouse robot 120, can be used to perform multiple tasks.

At 905, upon receiving a notification that an object has been misplaced, the central control can route the robot to retrieve the cleanup pod. As discussed above, this can include traversing the warehouse floor from the robot's current location to the cleanup pod's current location, the robot verifying that it has located the correct cleanup pod, orienting itself properly, and then lifting the cleanup pod for transportation.

At 910, the robot can then be routed to the reported area of the object. In some examples, the central control can provide all routing information to the robot. In other examples, some or all of the routing can be handled by systems onboard the robot (e.g., using GPS or other navigational aids). As mentioned above, in some examples, the central control can reroute traffic and override traffic patterns as necessary to provide the robot with the most efficient/quickest route. In other examples, the robot can follow established traffic patterns to reduce traffic disruption in the warehouse.

At 915, the robot can arrive at the reported location and drop off or place the cleanup pod. In some examples, the robot can place the cleanup pod within one fiducial or one grid of the object. In other embodiments, the robot can place the cleanup pod within reach of the object, which can vary based on the reach of the robotic arm on the cleanup pod.

At 920, the central control can then route the robot to retrieve an inventory holder. Of course, the robot could also perform other tasks such as, for example, recharging or utilizing additional tools (e.g., a floor sweeper). At 925, after retrieving the inventory holder, the robot can be routed to a work station. At 930, the robot can then place the inventory holder 130 at the work station to enable a worker to remove inventory for shipping, for example, or to replace inventory that has been previously retrieved from the inventory floor. This can enable the robot to continue to be productive while the cleanup pod retrieves the reported object, which can take from a few seconds to a few minutes, depending on the size, orientation, and location of the object.

Similarly, at 935, while the worker is engaged with the inventory holder, and when the cleanup pod has successfully retrieved the object, the central control can route the robot, or another warehouse robot, back to the cleanup pod to retrieve it. At 940, the robot can then deliver the cleanup pod—and the object—to a predetermined location. If the object is merchandise, for example, the robot can return the cleanup pod to a work area to enable the object to be inspected by a worker. If the object is determined to be sufficiently undamaged, the merchandise can be returned to the inventory holder from which it came, another inventory holder or any other appropriate location. In other examples, if the object is trash, it can be delivered to an appropriate area and disposed of directly, or transferred to a worker for disposal.

At 945, the warehouse robot can then return the cleanup pod to its normal location or another location, for example, or be routed to retrieve another object. In some examples, as shown in FIG. 1B, the cleanup pods may have a specific storage location when not in use. Because the cleanup pods are substantially the same dimensions as the inventory holders, in some examples, the cleanup pods can simply be stored together with the inventory holders. In some examples, the cleanup pods can be recharged, updated, and otherwise maintained in their home locations.

Examples of the present disclosure can also comprise a method for setting a safety area during object retrieval. In some examples, the safety area can remain in place for a set amount of time based on, for example, the average cleanup time, the longest cleanup time, or a calculated cleanup time. In some examples, the calculated cleanup time can be provided by an algorithm and can include, for example, travel time by a cleanup robot from its location to the object, recovery time (i.e., the time required to actually pick-up the object), and/or travel time for the cleanup robot to its next destination (e.g., a work station or trash receptacle). In other examples, such as when using a cleanup pod, the calculated cleanup time can comprise a wait time for an available robot, travel time for the robot to the cleanup pod, travel time to the object, retrieval time, travel time to the next destination (e.g., a work station or trash receptacle), and/or travel time to return the cleanup pod to its home location or next assignment. In any case, a predetermined amount of buffer time can also be included in the calculation to account for minor inconsistencies in the process.

In other examples, the cleanup robot 160, cleanup pod 180, and/or warehouse robot 120 can provide updates during the process. The cleanup robot 160 can send messages stating, for example, when it is on the way or on the scene, when a retrieval in process, when the retrieval is complete, when it is leaving the scene, when it reaches the next destination (e.g., a work station), and when it reaches its home or next destination. In some examples, the robot can also send a message stating that it has completed retrieval, but will be unavailable for a predetermined amount of time to recharge, update, or otherwise be out of service.

Regardless of whether a warehouse robot 120 and cleanup pod 180 or a cleanup robot 160 is used, the planning and execution of a retrieval can be performed by the central control 115, a separate retrieval control system, or an operator manually controlling the cleanup robot 160 and/or cleanup pod 180. In some examples, the planning and execution of a retrieval can be shared with the central control 115 routing a cleanup robot 160 or cleanup pod 180 to the reported location, an operator manually operating the cleanup robot 160 or cleanup pod 180 to retrieve the object 185, and the central control 115 routing the cleanup robot 160 or cleanup pod 180 to the desired location (e.g., a work station 150 or trash receptacle).

While several possible examples are disclosed above, examples of the present disclosure are not so limited. For instance, while a system of modular tools for warehouse robots is disclosed, other tools and other robots could be selected without departing from the spirit of the disclosure. In addition, the location and configuration used for various features of examples of the present disclosure such as, for example, the location and configuration of inventory holders and cleanup pods, the types of robots, and the layout of the warehouse can be varied according to a particular warehouse, inventory, or robot that requires a slight variation due to, for example, size or construction covenants, the type of robot required, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A cleanup robot comprising:
   one or more drive mechanisms to move the cleanup robot throughout a workspace;
   one or more imaging devices disposed on the cleanup robot to provide imagery of an area proximate to the cleanup robot;
   a carrying tray, disposed on a first end of the cleanup robot and moveable between a raised position and a lowered position, to receive an object from a floor of the workspace;
   one or more gate arms slideably engaged with the cleanup robot and moveable between an extended position and a retracted position; and
   one or more gates pivotally coupled to a first end of the one or more gate arms and pivotable between an open position and a closed position;
   wherein the one or more gates are moved from the open position to the closed position to encircle the object; and
   wherein the one or more gate arms and the one or more gates pivotally coupled thereto are moved from the extended position to the retracted position to pull the object onto the carrying tray in the lowered position.

2. The cleanup robot of claim 1, wherein the carrying tray further comprises:
   a rear portion pivotally coupled to the first end of the cleanup robot; and
   a deformable, forward portion coupled to the rear portion;
   wherein, in the raised position, the rear portion and the forward portion form a substantially flat carrying tray; and
   wherein, in the lowered position:
     the rear portion pivots downward with respect to the cleanup robot; and
     the forward portion deforms to substantially conform to the floor to receive the object onto the carrying tray.

3. The cleanup robot of claim 1, each of the one or more gates further comprising:
   a main portion defining a plurality of slots; and
   an edge strip slideably engaged with the plurality of slots and comprising:
      a rigid carrier to slideably couple the edge strip to the main portion; and
      a deformable edge to substantially conform to the floor.

4. The cleanup robot of claim 1, each of the one or more gate arms further comprising:
   a track detachably coupled to the cleanup robot; and
   an arm slideably engaged with the track and moveable between the extended position and the retracted position.

5. The cleanup robot of claim 1, each of the one or more gates further comprising a gate actuator to move the one or more gates between the open position and the closed position.

6. A method comprising:
   receiving, at a central control, a notification of an object improperly located on a floor of a workspace, the notification including at least an approximate location of the object within the workspace;
   designating, with the central control, a work zone encompassing at least the approximate location;
   transmitting, from the central control, the work zone to a plurality of robots operating in the workspace to route the plurality of robots around the work zone to prevent the plurality of robots from entering the work zone;
   routing a cleanup robot to the approximate location; and
   instructing the cleanup robot to recover the object and relocate the object on or within the cleanup robot.

7. The method of claim 6, further comprising:
   receiving, at the central control, another notification that the cleanup robot has recovered the object; and
   routing the cleanup robot, and the object, from the approximate location to a predetermined location to further process the object.

8. The method of claim 6, further comprising:
   receiving, at the central control, data associated with the object from one or more sensors on the cleanup robot;
   determining, with the central control, one or more characteristics of the object from the data;
   assigning, with the central control, a predetermined location based at least in part on the one or more characteristics of the object; and
   routing the cleanup robot, and the object, from the approximate location to the predetermined location to further process the object.

9. The method of claim 8, further comprising:
   determining, with the central control, that the object is an inventory item based at least in part on the one or more characteristics of the object;
   wherein the predetermined location comprises an inspection station.

10. The method of claim 6, further comprising:
    receiving, at the central control, another notification that the cleanup robot is unable to recover the object automatically;
    sending a teleoperation signal to recover the object using the cleanup robot in teleoperation mode;
    receiving, at the central control, a third notification that the object has been recovered using the cleanup robot in teleoperation mode; and
    routing the cleanup robot, with the object, from the approximate location to a predetermined location to further process the object.

11. The method of claim 6, further comprising:
    receiving, at the central control, an image of the object from one or more sensors on the cleanup robot;
    determining, with the central control, that the cleanup robot is unable to recover the object automatically;
    sending a teleoperation signal to recover the object using the cleanup robot in teleoperation mode;
    receiving, at the central control, a third notification that the object has been recovered using the cleanup robot in teleoperation mode; and
    routing the cleanup robot, with the object, from the approximate location to a predetermined location to further process the object.

12. The method of claim 6, wherein designating the work zone comprises:
    receiving an indication of a first fiducial marker located proximate the approximate location; and
    receiving an indication of a plurality of adjacent fiducial markers that encompass the first fiducial marker;
    wherein the work zone comprises an area bounded by the plurality of adjacent fiducial markers and encompassing the first fiducial marker.

13. The method of claim 6, wherein routing the cleanup robot to the approximate location of the object further comprises overriding one or more designated travel directions in the workspace to permit the cleanup robot to travel against the one or more designated travel directions.

14. The method of claim 6, further comprising:
    receiving an actual location for the object from the cleanup robot, the cleanup robot using at least one sensor to identify the actual location; and
    redesignating the work zone, with the central control, based on the actual location of the object;
    wherein redesignating the work zone comprises at least one of changing a size of the work zone or changing a location of the work zone.

15. The method of claim 6, further comprising:
    de-designating, with the central control, the work zone; and
    transmitting a signal, from the central control to the plurality of robots operating in the workspace, to return to normal operation to allow the plurality of robots to enter the work zone.

16. A cleanup robot comprising:
    one or more gate arms slideably engaged with the cleanup robot and moveable between an extended position and a retracted position; and
    one or more gates pivotally coupled to a first end of the one or more gate arms and pivotable between an open position and a closed position;
    a carrying tray, disposed on a first end of the cleanup robot and moveable between a raised position and a lowered position, to receive an object from a floor of a workspace, the carrying tray comprising:
       a rear portion pivotally coupled to the first end of the cleanup robot;
       a deformable forward portion coupled to the rear portion; and
       one or more carrying tray actuators to move the carrying tray between the raised position and the lowered position;
    wherein the one or more gates are moved from the open position to the closed position to encircle the object; and
    wherein the one or more gate arms and the one or more gates pivotally coupled thereto are moved from the extended position to the retracted position to pull the object onto the carrying tray in the lowered position.

17. The cleanup robot of claim 16, further comprising:
a sensor disposed in a downward facing manner to identify at least one fiducial marking of a plurality of fiducial markings disposed on the floor.

18. The cleanup robot of claim 16, each of the one or more gates further comprising a gate actuator to move the one or more gates between the open position and the closed position.

19. The cleanup robot of claim 18, each gate actuator further comprising:
a motor to move the gate between the open position and the closed position; and
an adapter to detachably couple the gate to the motor.

20. The cleanup robot of claim 16, each of the one or more gate arms further comprising a gate arm actuator, each gate arm actuator comprising:
a motor to move the gate arm between the retracted position and the extended position;
a drive gear coupled to the motor; and
a driven gear coupled to the gate arm and in meshed engagement with the drive gear to move the gate arm between the extended position and the retracted position.

* * * * *